United States Patent
Connor et al.

(10) Patent No.: US 6,866,950 B2
(45) Date of Patent: Mar. 15, 2005

(54) METHODS AND APPARATUSES FOR GAS SEPARATION BY PRESSURE SWING ADSORPTION WITH PARTIAL GAS PRODUCT FEED TO FUEL CELL POWER SOURCE

(75) Inventors: Denis J. Connor, West Vancouver (CA); Bowie G. Keefer, Vancouver (CA); Christopher R. McLean, Vancouver (CA); Shanna D. Knights, Burnaby (CA); Jean St-Pierre, Vancouver (CA)

(73) Assignee: QuestAir Technologies Inc., Burnaby (CA)

( * ) Notice: Subject to any disclaimer, the term of this patent is extended or adjusted under 35 U.S.C. 154(b) by 423 days.

(21) Appl. No.: 10/013,896

(22) Filed: Dec. 7, 2001

(65) Prior Publication Data

US 2002/0127442 A1 Sep. 12, 2002

Related U.S. Application Data

(60) Provisional application No. 60/254,417, filed on Dec. 8, 2000.

(51) Int. Cl.[7] .............................................. H01M 8/00
(52) U.S. Cl. ........................................... 429/13; 429/12
(58) Field of Search ..................................... 429/12, 13

(56) References Cited

U.S. PATENT DOCUMENTS

| | | | |
|---|---|---|---|
| 3,094,569 A | 6/1963 | Thomas | 95/117 |
| 3,204,388 A | 9/1965 | Asker | 95/119 |
| 3,430,418 A | 3/1969 | Wagner | 95/100 |
| 3,513,631 A | 5/1970 | Seibert et al. | 95/125 |
| 3,594,984 A | 7/1971 | Toyama et al. | 95/126 |
| 3,847,672 A | 11/1974 | Trocciola et al. | 429/46 |
| 3,865,924 A | 2/1975 | Gidaspow et al. | 429/16 |
| 4,019,879 A | 4/1977 | Rabo et al. | 95/140 |
| 4,144,037 A | 3/1979 | Armond et al. | 95/95 |
| 4,153,434 A | 5/1979 | Settlemyer | 96/111 |
| 4,200,682 A | 4/1980 | Sederquist | 429/17 |
| 4,272,265 A | 6/1981 | Snyder | 96/115 |
| 4,322,394 A | 3/1982 | Mezey et al. | 423/244.11 |
| 4,354,859 A | 10/1982 | Keller et al. | 95/96 |
| 4,399,966 A * | 8/1983 | Crudden et al. | 244/129.4 |

(List continued on next page.)

FOREIGN PATENT DOCUMENTS

| | | |
|---|---|---|
| CA | 1256038 | 6/1989 |
| CA | 2016045 | 8/1994 |
| CA | 2087972 | 1/2000 |

(List continued on next page.)

OTHER PUBLICATIONS

Vaporciyan and Kadiec, "Periodic Separating Reactors: Experiments and Theory," *AIChE Journal* 35, pp. 831–844 (1989), no month provided.

(List continued on next page.)

*Primary Examiner*—Patrick Ryan
*Assistant Examiner*—Thomas H. Parsons
(74) *Attorney, Agent, or Firm*—Klarquist Sparkman, LLP

(57) ABSTRACT

Various systems, method and apparatuses are disclosed that include a pressure swing adsorption apparatus coupled to a fuel cell, wherein the fuel cell receives at least a portion of a product gas from the pressure swing adsorption and powers the pressure swing adsorption apparatus. Also disclosed is a portable gas separator that include a housing that houses a rotary pressure swing adsorption apparatus.

71 Claims, 14 Drawing Sheets

U.S. PATENT DOCUMENTS

| | | | | |
|---|---|---|---|---|
| 4,406,675 A | | 9/1983 | Dangieri et al. | 95/26 |
| 4,452,612 A | * | 6/1984 | Mattia | 95/100 |
| 4,530,705 A | | 7/1985 | Firey | 96/116 |
| 4,532,192 A | | 7/1985 | Baker et al. | 429/16 |
| 4,555,453 A | | 11/1985 | Appleby | 429/41 |
| 4,578,214 A | | 3/1986 | Jungerhans | 252/376 |
| 4,587,114 A | | 5/1986 | Hirai et al. | 423/247 |
| 4,595,642 A | | 6/1986 | Nakanishi et al. | 429/19 |
| 4,702,903 A | | 10/1987 | Keefer | 423/359 |
| 4,726,816 A | | 2/1988 | Fuderer | 95/98 |
| 4,743,276 A | | 5/1988 | Nishida et al. | 95/140 |
| 4,758,253 A | | 7/1988 | Davidson et al. | 95/97 |
| 4,759,997 A | | 7/1988 | Ohyauchi et al. | 429/19 |
| 4,781,735 A | | 11/1988 | Tagawa et al. | 95/101 |
| 4,783,433 A | | 11/1988 | Tajima et al. | 502/74 |
| 4,790,858 A | | 12/1988 | Sircar | 95/101 |
| 4,801,308 A | | 1/1989 | Keefer | 95/96 |
| 4,816,121 A | | 3/1989 | Keefer | 204/156 |
| 4,914,076 A | | 4/1990 | Tsuji et al. | 502/407 |
| 4,917,711 A | | 4/1990 | Xie et al. | 95/106 |
| 4,963,339 A | | 10/1990 | Krishnamurthy et al. | 423/437.2 |
| 4,968,329 A | | 11/1990 | Keefer et al. | 95/98 |
| 4,969,935 A | | 11/1990 | Hay | 95/98 |
| 4,971,609 A | | 11/1990 | Pawlos | 96/128 |
| 4,988,580 A | | 1/1991 | Ohsaki et al. | 429/19 |
| 5,068,159 A | | 11/1991 | Kinoshita | 548/147 |
| 5,074,892 A | * | 12/1991 | Leavitt | 95/96 |
| 5,079,103 A | | 1/1992 | Schramm | 73/708 |
| 5,082,473 A | | 1/1992 | Keefer | 95/98 |
| 5,096,469 A | | 3/1992 | Keefer | 95/92 |
| 5,096,470 A | | 3/1992 | Krishnamurthy | 95/102 |
| 5,126,310 A | | 6/1992 | Golden et al. | 502/417 |
| 5,133,784 A | | 7/1992 | Boudet et al. | 95/100 |
| 5,175,061 A | | 12/1992 | Hildebrandt et al. | 429/16 |
| 5,227,598 A | | 7/1993 | Woodmansee et al. | 219/700 |
| 5,246,676 A | | 9/1993 | Hay | 423/219 |
| 5,248,325 A | | 9/1993 | Kagimoto et al. | 96/124 |
| 5,256,172 A | | 10/1993 | Keefer | 423/230 |
| 5,256,174 A | | 10/1993 | Kai et al. | 96/116 |
| 5,258,571 A | | 11/1993 | Golden et al. | 585/829 |
| 5,271,916 A | | 12/1993 | Vanderborgh et al. | 423/246 |
| 5,282,886 A | | 2/1994 | Kobayashi et al. | 95/131 |
| 5,328,503 A | | 7/1994 | Kumar | 95/101 |
| 5,366,818 A | | 11/1994 | Wilkinson et al. | 429/13 |
| 5,393,326 A | | 2/1995 | Engler | 95/103 |
| 5,411,578 A | | 5/1995 | Watson | 95/101 |
| 5,415,748 A | | 5/1995 | Emiliani et al. | 204/491 |
| 5,429,665 A | | 7/1995 | Botich | 95/99 |
| 5,431,716 A | | 7/1995 | Ebbeson | 96/125 |
| 5,434,016 A | | 7/1995 | Benz et al. | 429/13 |
| 5,441,559 A | | 8/1995 | Petit et al. | 96/125 |
| 5,487,775 A | | 1/1996 | LaCava et al. | 95/98 |
| 5,509,956 A | | 4/1996 | Opperman et al. | 95/109 |
| 5,523,326 A | | 6/1996 | Dandekar et al. | 518/706 |
| 5,531,809 A | | 7/1996 | Golden et al. | 95/101 |
| 5,543,238 A | | 8/1996 | Strasser | 429/17 |
| 5,593,478 A | | 1/1997 | Hill et al. | 96/111 |
| 5,604,047 A | | 2/1997 | Bellows et al. | 429/19 |
| 5,645,950 A | | 7/1997 | Benz et al. | 429/13 |
| 5,656,067 A | | 8/1997 | Watson et al. | 95/101 |
| 5,658,370 A | | 8/1997 | Vigor et al. | 95/96 |
| 5,711,926 A | | 1/1998 | Knaebel | 423/359 |
| 5,714,276 A | | 2/1998 | Okamoto | 429/17 |
| 5,766,311 A | | 6/1998 | Ackley et al. | 95/115 |
| 5,807,423 A | * | 9/1998 | Lemcoff et al. | 95/96 |
| 5,811,201 A | | 9/1998 | Skowronski | 429/17 |
| 5,827,358 A | | 10/1998 | Kulish et al. | 96/115 |
| 5,900,329 A | | 5/1999 | Reiter et al. | 429/17 |
| 5,917,136 A | | 6/1999 | Gaffney et al. | 95/98 |
| 5,925,322 A | | 7/1999 | Werth | 422/170 |
| 5,955,039 A | | 9/1999 | Dowdy | 422/189 |
| 5,981,096 A | | 11/1999 | Horburg et al. | 429/17 |
| 6,022,399 A | | 2/2000 | Ertl et al. | 95/114 |
| 6,045,933 A | | 4/2000 | Okamoto | 429/17 |
| 6,051,050 A | | 4/2000 | Keefer et al. | 95/96 |
| 6,056,804 A | | 5/2000 | Keefer et al. | 95/96 |
| 6,060,032 A | | 5/2000 | Hable et al. | 423/210 |
| 6,063,161 A | | 5/2000 | Keefer et al. | 95/100 |
| 6,143,057 A | | 11/2000 | Bülow et al. | 95/96 |
| 6,176,897 B1 | | 1/2001 | Keefer | 95/98 |
| 6,190,623 B1 | | 2/2001 | Sanger et al. | 422/192 |
| 6,190,791 B1 | | 2/2001 | Hornburg | 429/17 |
| 6,200,365 B1 | | 3/2001 | Eimer et al. | 95/19 |
| 6,231,644 B1 | | 5/2001 | Jain et al. | 95/96 |
| 6,283,723 B1 | | 9/2001 | Milburn et al. | 417/273 |
| 6,293,998 B1 | | 9/2001 | Dolan et al. | 95/96 |
| 6,296,823 B1 | | 10/2001 | Ertl et al. | 423/245.1 |
| 6,312,843 B1 | | 11/2001 | Kimbara et al. | 429/25 |
| 6,398,853 B1 | | 6/2002 | Keefer et al. | 96/125 |
| 6,406,523 B1 | | 6/2002 | Connor et al. | 96/125 |
| 6,651,658 B1 | * | 11/2003 | Hill et al. | 128/204.23 |
| 2002/0004157 A1 | | 1/2002 | Keefer et al. | |
| 2002/0098394 A1 | | 7/2002 | Keefer et al. | |

FOREIGN PATENT DOCUMENTS

| | | | |
|---|---|---|---|
| CA | 2087973 | | 1/2001 |
| CA | 2357627 | * | 3/2002 |
| DE | 3927729 | | 2/1991 |
| EP | 0 324 056 | | 7/1989 |
| EP | 0 341 189 A1 | | 8/1989 |
| EP | 0345908 | * | 12/1989 |
| EP | 0 143 537 B1 | | 3/1990 |
| EP | 0 143 537 A2 | | 3/1990 |
| EP | 0 681 860 A2 | | 7/1996 |
| EP | 0 691 701 A1 | | 10/1996 |
| EP | 0 750 361 A | | 12/1996 |
| EP | 2109055 | | 2/2000 |
| EP | 1 070 531 A2 | | 1/2001 |
| EP | 1 095 689 A1 | | 5/2001 |
| GB | 2 042 365 | | 9/1980 |
| JP | 59075574 A | | 4/1984 |
| JP | 63034862 A | | 7/1986 |
| JP | 07094200 A | | 7/1995 |
| JP | 8045526 A2 | | 2/1996 |
| JP | 10325360 A | | 12/1998 |
| JP | 11214021 A2 | | 8/1999 |
| WO | WO 94/04249 | | 8/1992 |
| WO | WO 98/29182 | | 9/1998 |
| WO | WO 99/01202 | | 1/1999 |
| WO | WO 99/28013 | | 6/1999 |
| WO | WO 99/46032 | | 9/1999 |
| WO | WO 00/16425 | | 3/2000 |
| WO | WO 00/16880 | | 3/2000 |
| WO | WO 01/41900 A1 | | 6/2001 |
| WO | WO 01/41900 A2 | | 6/2001 |
| WO | WO 02/067353 | * | 8/2002 |

OTHER PUBLICATIONS

Chatsiriwech et al., "Enhancement of Catalytic Reaction by Pressure Swing Adsorption," *Catalysis Today* 20, Elsevier Science, pp. 351–366 (1994), no month provided.

Hufton et al., "Sorption Enhanced Reaction Process for Hydrogen Production," *AIChE Journal*, vol. 45 No. 2, 248–256 (Feb. 1999).

* cited by examiner

METHODS AND APPARATUSES FOR GAS SEPARATION BY PRESSURE SWING ADSORPTION WITH PARTIAL GAS PRODUCT FEED TO FUEL CELL POWER SOURCE

CROSS REFERENCE TO RELATED APPLICATION

The present application claims priority from prior U.S. provisional application No. 60/254,417, filed on Dec. 8, 2000, which is incorporated herein by reference.

FIELD

This disclosure concerns gas separations conducted by pressure swing adsorption (PSA), such as air separation or air purification.

BACKGROUND

I. Pressure Swing Adsorption

Gas separation by pressure swing adsorption is achieved by coordinated pressure cycling and flow reversals over an adsorber contacted with a gas mixture that preferentially adsorbs a more readily adsorbed component relative to a less readily adsorbed component of the mixture. The total pressure is elevated during intervals of flow in a first direction through the adsorber from a first end to a second end, and is reduced during intervals of flow in the reverse direction. As the cycle is repeated, the less readily adsorbed component is concentrated in the first direction, while the more readily adsorbed component is concentrated in the reverse direction.

A first, or "light," product, depleted in the more readily adsorbed component and enriched in the less readily adsorbed component, is delivered from a second end of the adsorber. A second, or "heavy," product, enriched in the more strongly adsorbed component, is exhausted from a first end of the adsorber. The light product usually is the product desired to be purified by separation from the remaining components of the gas mixture, and the heavy product often is a waste or secondary product, as in the important examples of oxygen separation over nitrogen-selective zeolite adsorbents and hydrogen purification. The heavy product (enriched in nitrogen as the more readily adsorbed component) is a desired product in the example of nitrogen separation over nitrogen-selective zeolite adsorbents.

Typically, a feed mixture is admitted to a first end of an adsorber and the light product is delivered from the second end of the adsorber when the pressure is elevated to a higher working pressure. The heavy product is exhausted from the first end of the adsorber at a lower working pressure. To obtain a highly pure light product, a fraction of the light product enriched in the less readily adsorbed component is recycled back to the adsorbers as "light reflux" gas after pressure letdown, e.g. to perform purge, pressure equalization or repressurization steps.

The conventional process for gas separation by pressure swing adsorption uses two or more adsorbers in parallel, with directional valving at each end of each adsorber to connect the adsorbers in alternating sequence to pressure sources and sinks, thus establishing the changes of working pressure and flow direction. The basic pressure swing adsorption process inefficiently uses applied energy, because of irreversible expansion over the valves while switching the adsorbers between higher and lower pressures. More complex conventional pressure swing adsorption devices achieve some improvement in efficiency by using multiple "light reflux" steps, both to achieve some energy recovery by pressure equalization, and also desirably to sequence the light reflux steps so that lower purity light reflux gas reenters the second end of the adsorbers first, and higher purity light reflux gas reenters the second end of the adsorbers last, so as to maintain the correct ordering of the concentration profile in the adsorbers.

The conventional method of supporting the adsorbent is also problematic. There is a need for rigid high surface area adsorbent supports that can overcome the limitations of granular adsorbent and enable much higher cycle frequencies. High-surface-area laminated adsorbers, with the adsorbent supported in thin sheets separated by spacers to define flow channels between adjacent sheets, formed either as stacked assemblies or as spiral rolls, have been disclosed by Keefer, U.S. Pat. Nos. 4,968,329 and 5,082,473, which are incorporated herein by reference.

U.S. Pat. No. 4,968,329 discloses related gas separation devices with valve logic means to provide large exchanges of fresh feed gas for depleted feed gas. Such large feed exchanges may be required when concentrating one component as a desired product without excessively concentrating or accumulating other components, as in concentrating oxygen from feed air containing water vapor whose excessive concentration and accumulation would deactivate the adsorbent.

Siggelin (U.S. Pat. No. 3,176,446), Mattia (U.S. Pat. No. 4,452,612), Davidson and Lywood (U.S. Pat. No. 4,758,253), Boudet et al. (U.S. Pat. No. 5,133,784), and Petit et al. (U.S. Pat. No. 5,441,559) disclose PSA devices using rotary adsorber configurations. Ports for multiple, angularly separated adsorbers mounted on a rotor assembly sweep past fixed ports for feed admission, product delivery and pressure equalization. In this apparatus, the relative rotation of the ports provides the function of a rotary distributor valve. All of these prior art devices use multiple adsorbers operating sequentially on the same cycle, with multiport distributor rotary valves for controlling gas flows to, from and between the adsorbers.

The prior art includes numerous examples of pressure swing adsorption and vacuum swing adsorption devices with three adsorbers operating in parallel. Thus, Hay (U.S. Pat. No. 4,969,935) and Kumar et al. (U.S. Pat. No. 5,328,503) disclose vacuum adsorption systems which do not achieve continuous operation of compressors and vacuum pumps connected at all times to one of the three adsorbers. Such operation is achieved in other three adsorber examples provided by Tagawa et al. (U.S. Pat. No. 4,781,735), Hay (U.S. Pat. No. 5,246,676), and Watson et al. (U.S. Pat. No. 5,411,528), but in each of these latter examples there is some undesirable inversion of the ordering of light product withdrawal and light reflux steps so that process efficiency is compromised.

II. Fuel Cells

Various fuel cell types are known such as polymer electrolyte membrane (PEM) fuel cells, alkaline fuel cells and solid oxide fuel cells. In general, electrochemical fuel cells include an anode, a cathode, and an electrolyte, and generate electrical energy by converting chemical energy derived from a fuel directly into electrical energy by oxidizing fuel in the cell. Fuel and oxidant are supplied to the anode and cathode, respectively. In the case of PEM fuel cells, fuel permeates the electrode materials and reacts at the anode catalyst layer to form cations. These cations migrate through the electrolyte to the cathode. An oxidizing gas, such as oxygen or an oxygen-containing gas, supplied to the fuel cell reacts at the cathode catalyst layer to form anions, which react with the cations to form a reaction product. The fuel cell generates a useable electric current and the reaction product is removed from the cell.

If hydrogen is the fuel and oxygen-containing air (or pure oxygen) is the oxidant, a catalyzed reaction at the anode produces hydrogen cations from the fuel supply. An ion exchange membrane (1) facilitates the migration of hydrogen ions from the anode to the cathode, and (2) isolates the hydrogen fuel stream from the oxygen stream. At the cathode, oxygen reacts to form anions, which react with the hydrogen ions that have migrated across the membrane to form water as a reaction product.

The anode and cathode reactions for polymer-electrolyte-membrane-type fuel cells are shown in equations (1) and (2) below.

Anode reaction $H_2 \rightarrow 2H^+ + 2e^-$    Equation 1

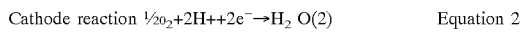
Cathode reaction $\frac{1}{2}O_2 + 2H^+ + 2e^- \rightarrow H_2O$ (2)    Equation 2

Two or more fuel cells connected together in series or in parallel are referred to as a stack and are used to increase the overall power output of the assembly. Fuel cells typically are connected in series with one side of a given plate serving as an anode plate for one cell and the other side of the plate serving as the cathode plate for the adjacent cell. The stack typically includes feed manifolds or inlets for directing fuel, such as substantially pure hydrogen, methanol reformate or natural gas reformate, and the oxidant, such as substantially pure oxygen or oxygen containing air, to the anode and cathode. The stack also generally includes exhaust manifolds or outlets for expelling any unreacted fuel and oxidant gases, each carrying entrained water, as well as an outlet manifold for the coolant water exiting the stack.

Fuel cells are known in the patent literature. For example, U.S. Pat. No. 5,200,278, entitled "Integrated Fuel Cell Power Generation System," assigned to Ballard Power Systems, Inc., and incorporated herein by reference, describes one embodiment of a fuel cell useful as a power source. Fuel cells also are commercially available.

III. Portable Gas Separators

Portable gas separators, such as might be used for generating oxygen of sufficient purity for respiration by mammals, such as humans, such as greater than 90 volume % pure, and perhaps 95 volume % and higher, are inefficient and typically are not easily portable by an individual. As such, the uses of conventional separators are limited. A need therefore exists for a portable, efficient gas separator for use as, for example, a medical oxygen generator.

SUMMARY

Disclosed herein are various systems, methods and apparatuses useful for separating components in a feed gas, particularly for providing an oxygen-enriched concentrated gas stream.

For example, a system is disclosed that includes a pressure swing adsorption apparatus that can produce a product gas and that defines a product gas outlet. A fuel cell power source powers the pressure swing adsorption apparatus and defines a cathode feed inlet. The product gas outlet of the pressure swing adsorption apparatus is fluidly coupled to the cathode feed inlet of the fuel cell to deliver at least a portion of the product gas to the fuel cell. At least one motor that receives an electrical current from the fuel cell can be coupled to the pressure swing adsorption apparatus.

A portable gas separator is also disclosed that includes a housing that houses a rotary pressure swing adsorption apparatus. Another disclosed apparatus is a portable oxygen concentrator that includes a rotary pressure swing adsorption apparatus for producing an oxygen-enriched gas. A motor is coupled to the rotary pressure swing adsorption apparatus. A fuel cell provides an electrical current to the motor and receives at least a first portion of the oxygen-enriched gas. The concentrator also includes a first user supply line fluidly coupled to the rotary pressure swing apparatus that can supply at least a second portion of the oxygen-enriched gas to a human being.

A gas separation method is also disclosed that involves introducing a feed gas (e.g., air) into a pressure swing adsorption apparatus to produce a product gas, introducing at least a portion of the product gas into a fuel cell, and generating an electrical current from the fuel cell to power the pressure swing adsorption apparatus.

An additionally disclosed method provides oxygen-enriched gas to a human being. This method includes introducing a feed gas into a pressure swing adsorption apparatus to produce a product gas that is enriched in oxygen relative to air and generating an electrical current from the fuel cell to power the pressure swing adsorption apparatus. A first variant of the method contemplates introducing at least a first portion of the product gas into a fuel cell and providing at least a second portion of the product gas to a human being. A second variant contemplates introducing at least a first portion of the product gas into a fuel cell to produce a cathode exhaust gas that is enriched in oxygen relative to air and providing the cathode exhaust gas to a human being.

BRIEF DESCRIPTION OF THE DRAWINGS

Like reference numerals in the drawings indicate like elements, unless indicated otherwise such as with respect to FIG. 14.

DETAILED DESCRIPTION OF SEVERAL EMBODIMENTS

Figure 1:
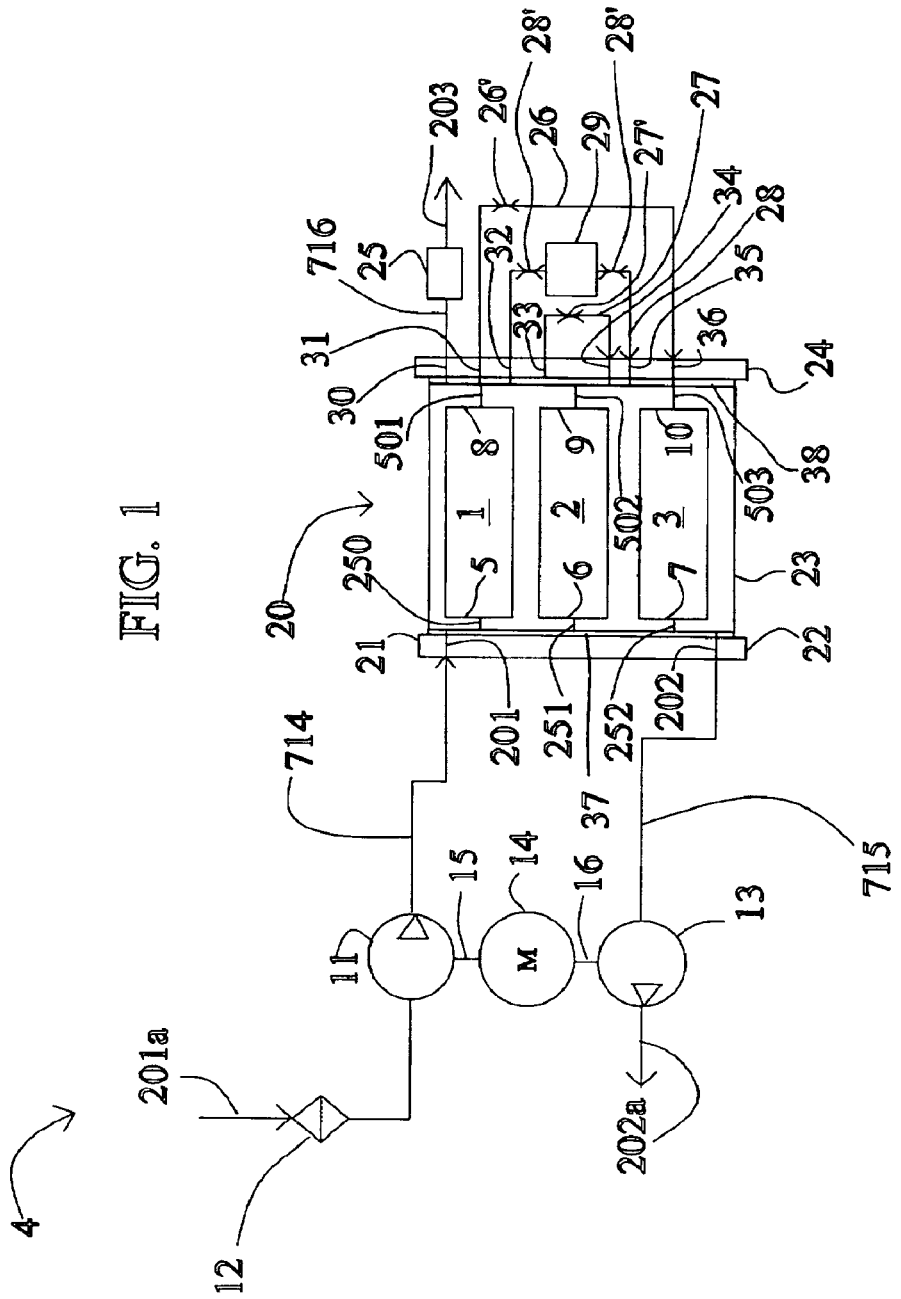
FIG. 1 shows a simplified schematic of a rotary vacuum oxygen concentrator with three adsorbers, a feed air compressor, and an exhaust vacuum pump.

Disclosed embodiments are described below with reference to the drawings. Definitions of certain terms, and general information concerning certain features of the disclosed embodiments, are provided below.

The following definitions are provided solely to aid the reader, and should not be construed to have a scope less than that understood by a person of ordinary skill in the art or as limiting the scope of the appended claims.

A. "Backfill" denotes feeding a portion of the oxygen-enriched gas to the product end of the bed. The feed end of the bed is closed during this operating step thus increasing the pressure in the bed.

B. "Blowdown" refers to a process where gas is being removed from a feed end of the bed (countercurrent) direction. The product end is closed. A vacuum pump is connected to the feed end of the bed and bed pressure is reduced.

C. "Cocurrent direction" is when the gas flows from a feed end to a product end.

D. "Countercurrent direction" is when the gas flows from a product end to a feed end.

E. "Light gas" denotes gas enriched in a less readily adsorbed component.

F. "Light reflux" refers to withdrawal of light gas from the second end of adsorbers, followed by pressure let-down and return of that light gas to other adsorbers at a lower pressure.

G. "Purge" is the step of withdrawing gas from a feed end of the bed. Gas enriched in oxygen is simultaneously fed to the product end of the bed, thereby purging the bed of remaining nitrogen. The bed remains at the substantially same pressure during the purge process.

H. "Rotary bed pressure swing adsorption apparatus" is an adsorption apparatus where adsorbers with adsorbent material are rotated relative to stationary valves for introducing and withdrawing gas streams.

I. "Rotary valve pressure swing adsorption apparatus" is an apparatus where valves for introducing and withdrawing gas streams are rotated relative to stationary adsorbers housing adsorbent material.

J. "Rotary pressure swing adsorption" includes, but is not limited to, a rotary bed pressure swing adsorption apparatus, a rotary valve pressure swing adsorption apparatus, or a pressure swing adsorption apparatus that includes rotating adsorbers and rotating valves.

The presently disclosed methods and apparatuses enable high frequency operation of pressure swing adsorption processes, with high-energy efficiency and with compact machinery of low capital cost.

One embodiment of a disclosed apparatus comprises a pressure swing adsorption apparatus (PSA) powered by a fuel cell. In other words, the fuel cell supplies an electrical current to at least one motor that, in turn, drives at least one component of the PSA. The PSA components that may be driven by the motor include, but are not limited to, at least one rotor (e.g., a rotary adsorber bed or a rotary valve), at least one compressor, and at least one exhauster. An outlet port of the PSA is fluidly coupled to an inlet port of the fuel cell. For example, using a nitrogen selective adsorbent, nitrogen can be separated as a heavy product and oxygen as a light product. A light product outlet port can be coupled to the fuel oxidant inlet line of the fuel cell cathode of the fuel cell powering the PSA.

According to another embodiment, there is disclosed a portable gas separator apparatus comprising a housing that receives or at least partially houses a rotary pressure swing adsorption device or module. The gas separator apparatus can be operated by a manual or pedal crank. Alternatively, a self-contained system can be provided further comprising a motor operably coupled to the fuel cell power source. In such embodiments, the pressure swing adsorption device includes a product outlet for delivering a product gas, the product outlet being fluidly coupled to an inlet port of the fuel cell to deliver product gas to the fuel cell. The fuel cell provides from about 25 watts to about 1 kilowatt to power the rotary pressure swing adsorption device for portable units.

Such portable gas separator apparatuses may be easily transported or moved by a single individual from one location to another location. For example, the portable gas separator apparatus may be provided with locomotion elements such as wheel(s) for rolling the apparatus over a ground or floor surface. The wheels may be coupled to a base of the apparatus housing. Alternatively, the portable gas separator apparatus may be secured in a cart frame that includes wheels. The portable gas separator also may be sufficiently lightweight so that a person can carry the separator from one location to the next.

Apparatuses are disclosed herein for PSA separation of a gas mixture containing a more readily adsorbed component and a less readily adsorbed component. The more readily adsorbed component preferentially is adsorbed from the feed gas mixture by an adsorbent material under increase of pressure, so as to separate from the gas mixture a heavy product gas enriched in the more readily adsorbed component, and a light product gas enriched in the less readily adsorbed component and depleted in the more readily adsorbed component. In one variant, the apparatus includes compression machinery cooperating with three adsorbers mounted in a rotary PSA module.

Each adsorber has a flow path for flowing a gas mixture in contact with adsorbent material positioned between first and second ends of the flow path. The adsorbers are mounted in an adsorber housing, which is engaged in relative rotation with first and second valve bodies to define rotary sealing faces of first and second valves adjacent, respectively, the first and second ends of the adsorber flow paths. In some disclosed embodiments, the adsorber housing is a rotor (adsorber rotor) which rotates while the first and second valve bodies together form the stator (referred to herein as "rotary bed PSA"). In alternative disclosed embodiments, the adsorber housing is stationary, while the first and second valve bodies achieve the valving function (referred to herein as "rotary valve PSA"). Fluid transfer means are provided to provide feed gas to the first valve body, to remove exhaust gas from the first valve body, and to deliver product gas from the second valve body.

The first valve admits a feed gas comprising a gas mixture to the first end of the adsorbers, and exhausts heavy product gas from the first end of the adsorbers. The second valve cooperates with the adsorbers to deliver light product gas from the second end of the flow path and adsorbers, to withdraw light reflux gas from the second end of the adsorbers, and to return light reflux gas to the second end of the adsorbers. The first and second valves are operated so as to define the steps of a PSA cycle performed sequentially in each of the adsorbers, while controlling the timings of flow at specified total pressure levels between the adsorbers and the compression machinery.

The PSA process establishes the PSA cycle in each adsorber, during which the total working pressure in each adsorber is cycled between a highest pressure and a lowest pressure of the PSA cycle. The highest pressure may be superatmospheric, such as about 1.1 bar (absolute) to about 3.0 bar (absolute), and the lowest pressure may conveniently be either atmospheric or subatmospheric, such as from about 0.5 bar (absolute) to about 1.0 bar (absolute). The PSA process also provides intermediate pressures between the higher and lower pressure. The compression machinery of the apparatus in general includes a feed gas compressor and a heavy product gas exhauster. The exhauster would be a vacuum pump when the lower pressure is subatmospheric. When the lower pressure is atmospheric, the exhauster could be an expander, or else may be replaced by throttle means to regulate countercurrent blowdown.

A buffer chamber is provided to cooperate with the second valve. The buffer chamber provides the "light reflux" function of accepting a portion of the gas enriched in the second component as light reflux gas from an adsorber at the higher pressure and during cocurrent blowdown to reduce the pressure from the higher pressure. That gas is returned from the buffer chamber to the same adsorber to provide purge at the lower pressure and then to provide light reflux pressurization to increase the pressure from the lower pressure. The light reflux function enables production of high-purity light product. According to a particular embodiment, the buffer chamber size is matched to the adsorber bed size such that the desired flow of light reflux gas enters or leaves the adsorber bed during an equalization of the buffer chamber and the adsorber bed.

The rotary pressure swing adsorption device may comprise a stator and an adsorber rotor rotating relative to the stator through a rotation period to define a pressure swing adsorption cycle. The rotor rotates n adsorbers angularly and typically equally, spaced about a rotation axis through the rotation period. The rotor typically has a rotation period of substantially 1/n to define the pressure swing adsorption cycle. The pressure swing adsorption cycle frequency may range from about 10 cycles/minute to about 200 cycles/minute, with at least about 25 cycles/minute being useful in particular embodiments. Theoretically, there is no upper limit on n, and adsorbers with n equal to at least 36 are known. With smaller numbers of adsorbers, the PSA cycles steps typically are achieved by switching one bed at a time into each step. With larger numbers of adsorbers, several adsorbers may be participating in staggered phases in each process step so that the process becomes semi-continuous. For portable or emergency units, the number of adsorbers used may be less solely for practical reasons, such as size and weight. For these embodiments n most likely is from about 2 to about 10 adsorbers, more likely about 3–9 adsorbers, and perhaps, from about 3 to about 6 adsorbers.

Each adsorber includes at least one adsorbent material, but more likely includes plural materials, such as a desiccant and a nitrogen-selective adsorbent. Moreover, the adsorbent material of a particular adsorber may be the same adsorbent material or a different adsorbent material from that of the other adsorbers. The adsorbent material is located in a flow path for flowing a gas mixture in contact with the adsorbent material from a first end of the adsorber to a second end of the adsorber.

The first end of the adsorber is capable of being fluidly coupled to a first valve surface between the rotor and the stator and the second end is capable of being fluidly coupled to a second valve surface between the rotor and the stator. The first valve surface has feed and outlet ports, the second valve surface has a light product port. The rotary bed pressure swing apparatus also may include a buffer chamber fluidly coupled to the adsorbers. A light product port is fluidly coupled to an inlet port of a fuel cell, where the light product typically is enriched in oxygen relative to a feed gas mixture. The fuel cell is operably coupled to the rotary bed pressure swing adsorption device.

The gas separator can operate as a medical or emergency oxygen generator where the product gas is enriched in oxygen relative to air and a portion of the product gas is supplied to the fuel cell and a portion of the product gas is supplied to a patient. For example, about 10 to about 30 volume percent of the oxygen-enriched product gas may be supplied to the fuel cell and the remaining oxygen-enriched product gas may be supplied to a patient and/or storage container. The product gas may be supplied directly to the fuel cell, or may be mixed with at least one second gas, such as air, to form a fuel cell feed mixture prior to feeding the feed mixture to the fuel cell.

A particular embodiment of a disclosed portable medical or emergency oxygen concentrator comprises a stator and an adsorber rotor powered by a motor and rotating relative to the stator through a rotation period to define a pressure swing adsorption cycle. The motor is an electrical motor that can receive an electrical current from the fuel cell. The rotor rotates n adsorbers equally angularly spaced about a rotation axis through the rotation period where n is unlimited but most likely is from about 3 to about 6 as stated above. Each adsorber may include a lithium-exchanged adsorbent material located in a flow path for flowing air in contact with the adsorbent material from a first end of the adsorber to a second end of the adsorber. Each adsorber has (1) a first end that includes apertures for fluidly coupling to a first valve surface between the rotor and the stator, and (2) a second end having apertures capable of fluidly coupling to a second valve surface between the rotor and the stator. The first valve surface defines at least one feed port for receiving an air stream and at least one outlet port. The second valve surface has a product port for supplying oxygen-enriched gas as a product gas. The gas separator or concentrator further comprises a buffer chamber fluidly coupled to the adsorbers. A fuel cell is fluidly coupled to the light product port for receiving at least a portion of the oxygen-enriched product gas from the PSA as an oxidant for the fuel cell cathode and operably coupled to the motor for powering the rotary bed pressure swing adsorption component. A user supply line is provided to supply oxygen-enriched product gas to a user, such as a patient, high-elevation hiker, or submariner. The gas separator may further include an air stream inlet for mixing air with the product gas from the pressure swing adsorption apparatus to form a fuel cell feed mixture prior to feeding the feed mixture to the fuel cell. Moreover, exhaust from the fuel cell comprising water vapor may be mixed with the oxygen-enriched product gas to humidify such gas prior to administration to a user.

A rotary pressure swing adsorption process also is described. The process includes providing a pressure swing adsorption device, such as a rotary bed or rotary valve device having a fuel cell power source operably coupled thereto for supplying an electrical current to a motor that, in turn, powers the pressure swing adsorption device. A feed gas mixture is supplied to the device over a feed interval.

Product gas is withdrawn from the device and a portion of the product gas is supplied to an inlet port of the fuel cell that powers the pressure swing adsorption device. In disclosed embodiments, the product gas is oxygen-enriched, which is introduced to the inlet port of an oxidant inlet line for the fuel cell. A portion of an exhaust stream from the fuel cell comprises water vapor, and the water vapor may be mixed with oxygen-enriched product gas to form a patient product gas that is supplied to a patient at a feed rate of from about 1 liter per minute to about 5 liters per minute, with 1–2 liters per minute being expected for portable units.

The disclosed apparatuses have a number of applications including, without limitation, home-use medical oxygen concentrators, portable oxygen concentrators, ultra low power oxygen concentrators (e.g. for third world medical clinics), and manually-operated oxygen concentrators or air purifiers for survival life support.

One aspect of the disclosed methods and systems comprises introducing a gas stream enriched in a selected component (e.g., oxygen) produced by a PSA apparatus to increase the efficiency of a fuel cell. The fuel cell powers the PSA apparatus, and perhaps other apparatuses as well. For example, a light product port from a PSA apparatus using nitrogen-selective adsorbents could be coupled to the cathode oxidant inlet port of the fuel cell. Alternatively, the heavy product exhaust port of a PSA using oxygen selective adsorbents could be coupled to the cathode oxidant inlet port of the fuel cell.

The PSA and fuel cell apparatuses can be known apparatuses, or future-developed apparatuses. For example, a PSA-fuel cell system might comprise a pressure swing adsorption device having adsorbers and valve systems cooperating with the adsorbers to supply gas streams to and withdraw gas streams from the adsorbers, the adsorbers and valve systems rotating relative to one another. The adsorbers may rotate relative to the valve systems (rotary bed systems), the valve systems may rotate relative to the adsorbers (rotary valve systems), or the adsorbers and the valve systems both may rotate.

Systems having rotating valve systems are known, and certain embodiments are described in the patent literature, including van Weenan's U.S. Pat. No. 4,469,494; Hill et al., U.S. Pat. Nos. 5,112,367, 5,268,021, and RE035099; Schartz, U.S. Pat. No. 5,632,804; Nemcoff et al. U.S. Pat. Nos. 5,807,423, 5,814,130, 5,814,131, 5,820,656, and 5,891,217; and Keefer et al., U.S. Pat. No. 6,063,161.

Figure 13:
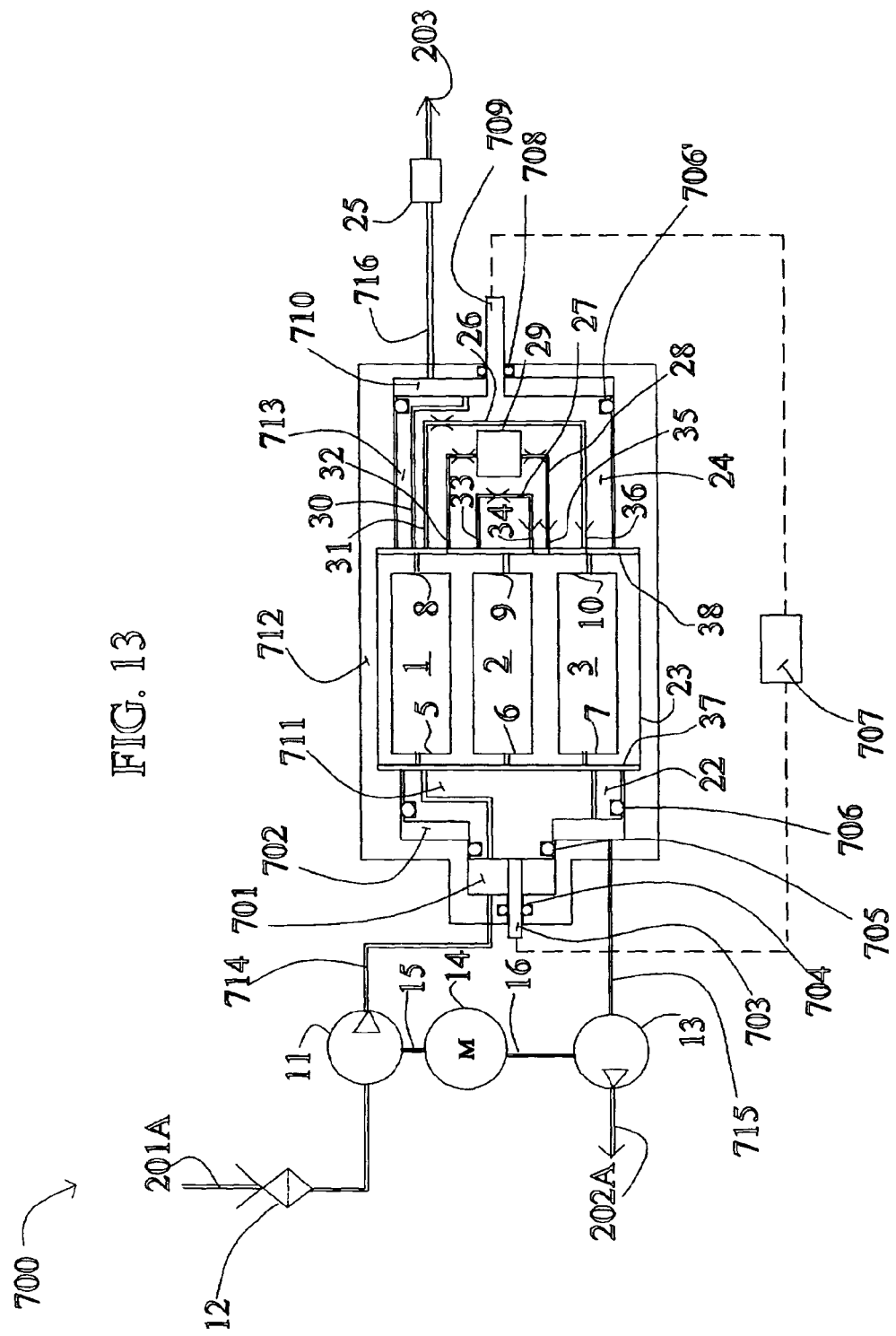
FIG. 13 is a schematic view of a PSA apparatus having a rotary valve system.

FIG. 13 of the present disclosure shows an embodiment 700 similar to FIG. 1, but with the adsorber housing body stationary while the first and second valve bodies rotate. The adsorbers are mounted at equal angular spacings in an adsorber housing body 23, which is engaged in relative rotation with first and second valve bodies 711 and 713 to define rotary sealing faces of first and second valves adjacent respectively the first and second ends of the adsorber flow paths. There is fluid sealing engagement between the adsorber housing body and respective first and second valve bodies. The adsorber housing body 23 is stationary, while the first and second valve bodies 711 and 713 rotate to achieve the valving function. Fluid transfer means are provided to provide feed gas to the first valve body 711, to remove exhaust gas from the first valve body 711, and to deliver product gas from the second valve body 713.

In this embodiment, the first valve body has fluid seals 704 and 705 which define the feed fluid transfer chamber 701 as fluid transfer means to provide feed gas to the first valve body between the first valve body 711 and the casing 712. Feed gases are conducted through conduit 714.

The first valve body also has fluid seals 705 and 706 which define the exhaust fluid transfer chamber 702 between the first valve body 711 and the casing 712. Chamber 702 is a fluid transfer means to remove exhaust gas from the first valve body. Exhaust gases are conducted through conduit 715.

The second valve body 713 has rotary fluid seals 706' and 708 that define the product fluid transfer chamber 710 between the second valve body 713 and the casing 712. Chamber 710 is a fluid transfer means to deliver light product gas from the second valve body into conduit 716.

FIG. 13 shows a rotary drive shaft for each valve body that drives rotation of the first and second valves at the cycle frequency and in coordinated angular phase, with shaft 703 driving first valve body 711 and shaft 709 driving second valve body 713. If desired, with a coaxial installation of the first and second rotary valves, shafts 703 and 709 may be combined as a single shaft (e.g., penetrating the adsorber housing body) to drive both valve bodies. The shafts are driven to rotate by valve drive means 707, such as a valve drive motor or an extension shaft from a gear reducer coupled to the compressor drive shaft.

Moreover, PSA devices that perform more than one pressure swing adsorption cycle per revolution can be used to practice the disclosed method.

One embodiment of the disclosed process for coupling a product gas line from a PSA apparatus to a fuel cell powering the PSA apparatus comprises a portable oxygen concentrator. The following discussion pertains particularly to this embodiment, but it should be appreciated that the method is not limited to this particular PSA apparatus.

A. General Process Steps for a Portable 3-Bed Adsorber

The may be performed in each adsorber, which generally involves sequentially repeated steps within the cycle period. Of course, there can be variations in the described process and different processes could be performed in different adsorbers in a single PSA apparatus.

(A) Feed pressurization and production. Feed gas mixture is admitted to the first end of the adsorber during a feed time interval over approximately ⅓ of the cycle period (0T–T/3). The feed time interval commences when the pressure within the adsorber is a first intermediate pressure between the lowest cycle pressure and the highest cycle pressure, and includes pressurizing the adsorber to the higher pressure (step A1), and then delivering light product gas from the second end (step A2) at a light product delivery pressure that is substantially the highest pressure less minor pressure drops due to flow friction. The light product gas is then apportioned and delivered as desired, such as partially to a patient and partially to an inlet port of a fuel cell operably coupled to the disclosed embodiment of a medical oxygen concentrator.

(B) Withdrawing from the second end a first light reflux gas enriched in the less readily adsorbed component (preferably following step A2 of light product delivery) at approximately the highest pressure during a brief time interval at or near the end of step A (T/3).

(C) Equalization to buffer chamber. While flow at the first end of the adsorber is stopped during a cocurrent blowdown time interval following step B, withdrawing a second light reflux gas enriched in the less readily adsorbed component as light reflux gas from the second end of the adsorber into the buffer chamber, and depressurizing the adsorber toward a second intermediate pressure between the highest pressure and the lowest pressure.

(D) Withdrawing a third light reflux gas from the second end as purge flow for another adsorber, during a brief time interval at approximately the end of step C (T/2).

(E) Countercurrent blowdown and exhaust. Exhausting a flow of gas enriched in the more readily absorbed component from the first end of the adsorber during an exhaust time interval (T/2–5T/6) (i.e., ½ to ⅚ of the way through the cycle period), in (E1) to depressurize the adsorber from the second intermediate pressure to the lowest pressure, and then (E2) transferring a flow of third light reflux gas from the second end of another adsorber undergoing step D to purge the adsorber at substantially the lowest pressure while continuing to exhaust gas enriched in the first component as a heavy product gas.

(F) Increasing adsorber pressure by equalization with buffer chamber. While flow at the first end of the adsorber is stopped, supplying second light reflux gas from the buffer chamber to the second end of the adsorber to increase the pressure of the adsorber from substantially the lower pressure to the second intermediate pressure.

(G) Admitting a flow of first light reflux gas from the second end of another adsorber as backfill gas to increase adsorber pressure to the first intermediate pressure for the beginning of step A of the next cycle.

Alternative light reflux flow patterns may be used. For example, the order of A–G can vary, and steps may be added, deleted, delayed, etc. As specific non-limiting examples, B and G could be deleted, or B delayed to follow step A rather than overlap step A so it acts as a pressure equalization step. With appropriate porting of the second valve, the disclosed apparatus may be used to implement the process steps of prior cycles with three adsorbers, for example as prescribed in any of the above cited U.S. Pat. Nos. 4,781,735, 4,969,935, 5,246,676, 5,328,503, and 5,411,528, which are incorporated herein by reference.

The process may be controlled by varying the cycle frequency so as to achieve desired purity, recovery and flow rates of the light product gas. Alternatively, the feed flow rate and the light product flow rate may be adjusted at a given cycle frequency so as to achieve desired light product purity. Preferably, light product flow rate is adjusted to maintain delivery pressure in a light product receiver by simultaneously varying feed compressor drive speed and the rotational frequency of the PSA module. Several factors influence light product purity including: product flow rate, with increased flow rate decreasing light product purity; adsorbent, with different adsorbents, and combinations thereof, providing different separation capabilities; pressure, with increased pressure providing increased light product purity; and cycle frequency, with increased frequency increasing purity.

In vacuum pump embodiments, the first intermediate pressure and second intermediate pressure are typically approximately equal to atmospheric pressure, so that the lowest pressure is subatmospheric. Alternatively, the lowest pressure may be atmospheric.

In air purification applications, the first component is a gas or vapor impurity, the gas mixture is air containing the impurity, and the light product is purified air. In air separation applications, for disclosed embodiments the more readily adsorbed component is nitrogen, the less readily adsorbed component is oxygen, the adsorbent material includes a nitrogen-selective zeolite, the gas mixture is air, and the light product is enriched oxygen. Alternatively, the adsorbent may be an oxygen-selective adsorbent material with nitrogen being removed as a light product.

B. Zeolites

Illustrative adsorbent materials include materials preferentially adsorbing nitrogen relative to oxygen and materials preferentially adsorbing oxygen relative to nitrogen. For oxygen generators, oxygen would be removed as the light product with adsorbent materials that preferentially adsorb nitrogen, and as the heavy product for adsorbent materials that preferentially adsorb oxygen. Zeolites, particularly cation-exchanged zeolites and chabazites are examples of classes of materials useful as adsorbent materials for the disclosed embodiments. Preferred classes of zeolites include, without limitation, sodium- and calcium-exchanged A zeolites, particularly calcium-exchanged; calcium-sodium- and lithium- and sodium-exchanged X zeolites; and calcium-, lithium- and sodium-exchanged low silica X zeolites; and calcium-lithium and strontium-exchanged chabazites.

Zeolites typically are highly crystalline alumino-silicate materials frameworks comprising $[SiO_4]^{4-}$ and $[AlO_4]^{5-}$ tetrahedral units. Si and Al are joined by oxygen bridges, and the overall negative surface charge requires counter ions, e.g. $Li^+$, $Na^+$, $K^+$ and $Ca^{2+}$. Zeolites useful for adsorption separation of gases from mixtures are known, and are described in the patent and other literature, including for example:

U.S. Pat. No. 5,419,891, entitled "Zinc Cation Exchanged Lithium X-Zeolite for Nitrogen Adsorption";

U.S. Pat. No. 4,481,018, which describes various polyvalent cation (particularly alkaline earth elements magnesium, calcium, strontium and barium) X-zeolites and faujasites which have low silicon to aluminum ratios in the order of approximately 1 to 1.2. The zeolites are useful for nitrogen adsorption, particularly from gas mixtures such as air when activated to minimize the presence of water as it evolves from the material;

U.K. Patent No. 1,580,928, which describes a process for making low silica X-zeolites ("LSX"; where LSX is X-zeolite with a Si/Al=1 in the reference) comprising preparing an aqueous mixture of sources of sodium, potassium, aluminate and silicate and crystallizing the mixture at below 50° C. or aging the mixture at 50° C. or below, followed by crystallizing the same at a temperature in the range of 60° C. to 100° C.;

Gunter and H. Kuhl in "Crystallization of Low-Silica Faujasite" *Zeolites* (1987) 7, p451 disclose a process for making low silica X-zeolites comprising dissolving sodium aluminate in water with the addition of NaOH and KOH. Sodium silicate was diluted with the remaining water and rapidly added to the $NaAlO_2$—NaOH—KOH solution. The gelled mixture was then aged in a sealed plastic jar;

Low silica X-zeolite synthesis processes are known, such as those set forth in U.S. Pat. No. 4,606,899;

U.S. Pat. No. 4,557,736 discusses modifying X-zeolites by ion exchange of available ion sites with several divalent cations to produce a binary, ion-exchanged X-zeolite wherein the binary ions which are exchanged comprise calcium and strontium having higher nitrogen adsorption capacity, low heat of nitrogen adsorption and good nitrogen selectivity for air separation;

X-zeolites can be exchanged with lithium to provide an improved nitrogen selective adsorbent as set forth in U.S. Pat. No. 4,859,217, which states that an improved nitrogen adsorbent can be achieved when an X-zeolite is exchanged with lithium cations at greater than 88%;

Lithium X-zeolite was reported in U.S. Pat. No. 3,140,933 as being useful for nitrogen-oxygen separations;

Multiple cation exchange of zeolites with alkaline earth metals are disclosed in U.S. Pat. Nos. 4,964,889, 5,152,813, and 5,174,979;

U.S. Pat. No. 4,880,443, entitled "Molecular Sieve Oxygen Concentrator with Secondary Oxygen Purifier," teaches using a zeolite molecular sieve bed having 5 AMG zeolite coupled to a carbon molecular sieve bed. After testing, the inventors determined that several types of carbon molecular sieves Takeda 3A, manufactured by Takeda Chemical Industries, Ltd., Japan, worked well; and U.S. Pat. No. 5,258,058, entitled "Nitrogen Adsorption with a Divalent Cation Exchanged Lithium X-Zeolite," describes making sodium, potassium LSX-zeolite by the method of Kuhl ("Crystallization of Low-Silica Faujasite" Zeolites 7:451 (1987) which comprised dissolving sodium aluminate in water with the addition of NaOH and KOH. Sodium silicate was diluted with the remaining water and rapidly added to the $NaAlO_2$—NaOH—KOH solution. The gelled mixture was aged in a sealed plastic jar for a specified time at a specified temperature. The product is filtered and washed. Lithium LSX-Zeolite was prepared by ion exchange of sodium, potassium LSX-zeolite powder using five static exchanges at 100° C. with a 6.3-fold equivalent excess of 2.2M LiCl. Sodium LSX-zeolite was prepared by ion exchange of sodium, potassium LSX-zeolite using three static exchanges at 100° C. with a 4.2-fold equivalent excess of 1.1 M NaCl. Various exchange levels of $M^2+$, lithium LSX-zeolite were prepared by adding separate samples of the initially prepared lithium LSX-zeolite powder to stoichiometric amounts of 0.1N $M^2+$ salt solution with a pH between 5.6 and 7.0 and stirring at room temperature for about 4 hours. The mixed cation samples were filtered but not washed.

Zeolites also are commercially available, from companies such as Zeolyst, Valley Forge, Pa.

C. Adsorbent Bed Structures

In certain disclosed embodiments, the adsorbent is supported in the form of a layered adsorbent or "adsorbent laminate," formed from flexible adsorbent sheets. The adsorbent sheets are thin sheets of adsorbent with a composite reinforcement, or as an inert sheet or foil coated with the adsorbent. Flow channels are established by spacers forming parallel channels between adjacent pairs of sheets. The channel width between adjacent adsorbent sheets of the experimental adsorbers may be in the range of 50% to 100% of the adsorbent sheet thickness. This "adsorbent laminate" configuration has a much lower pressure drop than packed adsorbers, and avoids the fluidization problem of packed adsorbers. The adsorbent sheets are typically in the range of 100 to 175 microns thick. The sheet-laminate provides desirable compliance to accommodate stacking or rolling errors, and spacer systems provide the necessary stability against unrestrained deflections or distortions that would degrade the uniformity of the flow channels between adjacent layers of adsorbent sheet. Adsorbers of the layered adsorbent sheet material may be formed by stacking flat or curved sheets. Alternatively, adsorbers may be a spiral roll, with the flow channels between the sheets extending from the first end of the adsorber to the second end thereof. The adsorbers generally fill the volume of the adsorber housing of the desired shape. Examples of methods and structures with packed, spirally wound adsorbents are disclosed in commonly-owned, co-pending U.S. Provisional Application No. 60/285,527, filed Apr. 20, 2001, and incorporated herein by reference.

According to one variation of the disclosed PSA units, the adsorbent material contacting the flow channels between the first and second ends of the adsorbers may in general be selected to be different in distinct zones of the flow channels, so that the adsorbers would have a succession of zones (e.g. a first zone, a second zone, a third zone, a perhaps additional zones) with distinct adsorbents proceeding along the flow channels from the first end to the second end. As an alternative to distinct zones of adsorbents, the different adsorbents may be provided in layers or mixtures that include varying gradients of adsorbent concentrations along the gas flow path. The transition from one adsorbent to another may also be a blended mixture of the two adsorbents rather than a distinct transition. A further option is to provide a mixture of the different adsorbents that may or may not be homogeneous and such mixture may be combined with a discrete zone or zones.

Figure 2:
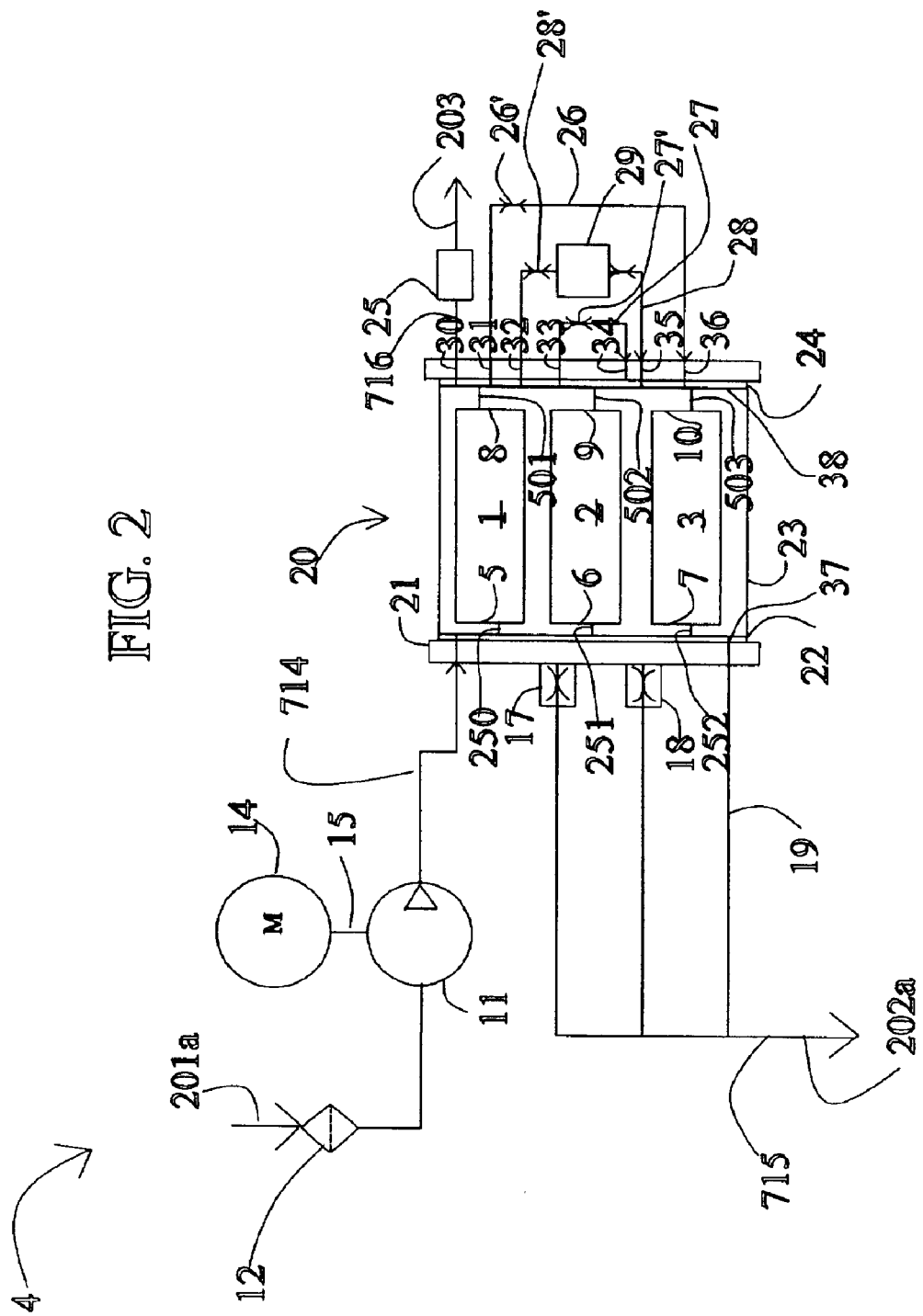
FIG. 2 shows a rotary positive pressure oxygen concentrator with three adsorbers, with each adsorber communicating to a feed air compressor.
Figure 3:
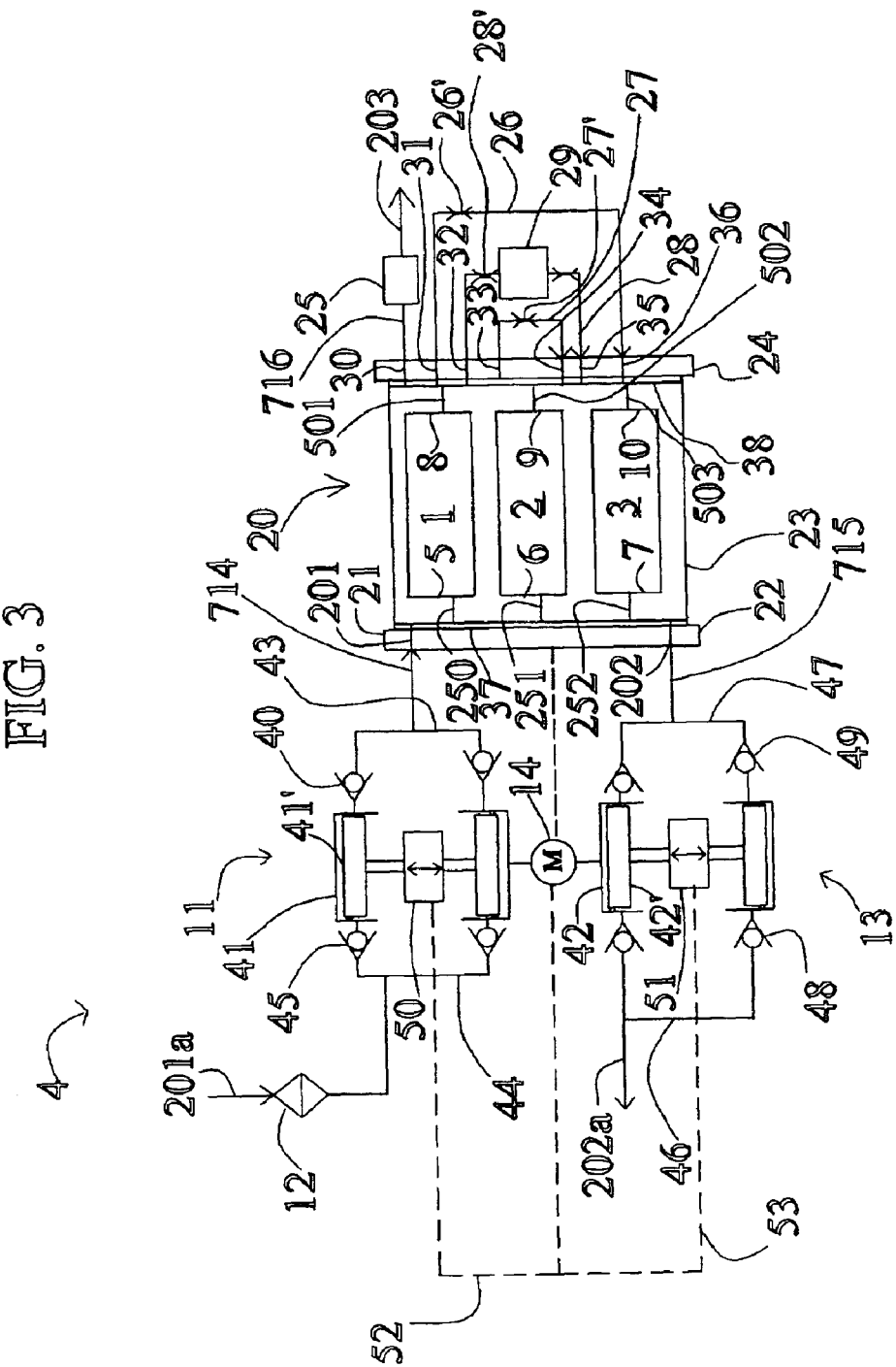
FIG. 3 shows a more detailed schematic of a rotary vacuum oxygen concentrator apparatus with three adsorbers, with each adsorber communicating to a feed air compressor, and an exhaust vacuum pump.

A. FIGS. 1, 2 and 3

A representative disclosed embodiment of an oxygen concentrator includes plural (n) adsorbers, where n typically is from 3–6 adsorbers, with the illustrated embodiment having three adsorbers 1, 2 and 3 in apparatus 4 (the rotary PSA module), the adsorbers having respective first ends 5, 6 and 7, and second ends 8, 9 and 10. The PSA cycle is performed in the three adsorbers, with a phase shift of 120° between the adsorbers in the sequence of adsorbers 1, 2 and then 3. FIGS. 1 and 3 show vacuum assisted embodiments, while FIG. 2 shows a positive pressure embodiment without vacuum assist.

Apparatus 4 includes a rotary adsorber module 20 including first valve body 22, adsorber housing body 23 and second valve body 24. Relative rotation is established between the adsorber housing body 23 and the first and second valve bodies, with fluid sealing engagement between the adsorber housing body and the first valve body across a first engagement between the adsorber housing body and the first valve body across a first valve face 37, and with fluid sealing engagement between the adsorber housing body and the second valve body across a second valve face 38. In this embodiment and those shown in FIGS. 2 and 3, the adsorber housing body 23 is rotating and hence may also be referred to as rotor 23, while the first and second valve bodies are stationary and together constitute stator 21 of module 20.

In the adsorber housing body 23, adsorber body ports 250, 251 and 252 provide fluid communication between adsorber first ends 5, 6 and 7 to the first valve face 37, while adsorber body ports 501, 502 and 503 provide fluid communication between adsorber second ends 8, 9 and 10 to the second valve face 38.

Functional ports 201 and 202 in the first valve body 22 respectively provide fluid communication to first valve face 37 for feed and exhaust (or heavy product) functions. Compressor 11 or blower 11 is provided to draw feed air through inlet filter 12 from feed inlet 201a, and to supply compressed feed air to port 201 through conduit 714, which serves as feed fluid transfer means cooperating with the first valve body. In FIGS. 1 and 3, an exhauster 13 or vacuum pump 13 is provided to exhaust nitrogen enriched air 202a from port 202 by conduit 715, which serves as exhaust fluid transfer means cooperating with the first valve body. A motor 14 is provided to drive compressor 11 by shaft 15 and vacuum pump 13 by shaft 16. According to particular embodiments, the motor 14 may be an electric motor (i.e. a stepper motor), a hydraulic motor, or a manual crank.

Functional ports 30, 31, 32, 33, 34, 35 and 36 in the second valve body 24 respectively provide fluid communication to second valve face 38 for the functions of light product delivery, first light reflux exit, second light reflux exit, third light reflux exit, third light reflux return, second light flux return, and first light flux return. The light product (e.g. enriched oxygen or purified air) is delivered from port 30 by conduit 716, which serves as light product fluid transfer means cooperating with the first valve body. The light product is delivered by conduit 716 to a product delivery valve 25 and thence to product delivery conduit 203. Valve 25 serves to control product flow and/or to regulate the PSA cycle working pressure in port 30.

First light reflux exit port 31 and first light reflux return port 36 are connected by first light reflux conduit 26 which provides the purge function of the PSA cycle. Second light reflux exit port 32 and second light reflux return port 35 are connected by second light reflux conduit 28 which provides the equalization function of the PSA cycle through buffer chamber 29 in conduit 28. Third light reflux exit port 33 and third light reflux return port 34 are connected by third light reflux conduit 27 which provides the product repressurization or backfill function of the PSA cycle. Fixed or adjustable throttle restrictors or orifices 26', 28' and 27' are included in each of the light reflux conduits 26, 28 and 27, respectively, to achieve pressure let-down of light reflux flows in each of the three light reflux stages of the PSA process.

FIG. 2 shows a rotary positive pressure PSA oxygen concentrator. In this embodiment, the exhauster 13 is replaced with exhaust conduits incorporating throttle orifices 17 and 18 for controlled pressure release during countercurrent blowdown, and a low pressure exhaust conduit 19 exhausting directly to atmosphere. Throttle orifice 17 may be more restrictive than throttle orifice 18 in order to support an initially larger pressure drop during the early part of a countercurrent blowdown step, while throttle 18 would support a smaller pressure drop in the later part of a countercurrent blowdown step. Alternatively, throttle orifices 17 or 18 may be combined into a single orifice, which may be provided by tapering port so as to be very restrictive at the beginning of a countercurrent blowdown step and ultimately fully open at the end of the countercurrent blowdown step.

Another alternative embodiment for a positive pressure PSA oxygen concentrator (now based on FIG. 1) is to provide exhauster 13 as an expander 13 for energy recovery during the countercurrent blowdown step, with expander 13 assisting motor 14 to drive compressor 11.

FIG. 3 shows a particular embodiment of the compressor and vacuum pump. The filtered air from inlet air filter 12 enters a compressor intake manifold 44 to be inducted by an inlet check valve 45 into one of two opposed compressor cylinders 41 cooperating with piston 41', and then is delivered by a discharge check valve 40 and compressor exhaust manifold 43 to conduit 714 transferring the compressed feed air to feed port 201. Similarly, exhaust nitrogen-enriched or impurity laden air is withdrawn by conduit 715 from exhaust port 202 into vacuum pump intake manifold 47, by a vacuum pump inlet check valve 49 into one of two opposed vacuum pump cylinders 42 cooperating with pistons 42', and then is delivered by a vacuum pump delivery check valve 48 via exhaust manifold 46 to exhaust conduit 202a. It will be appreciated that pistons 41' or 42' are cyclic volume displacement means, which could equivalently be provided as reciprocating pistons or reciprocating diaphragms.

Each pair of opposed pistons 41' and 42' is driven in reciprocating motion by a reciprocating crank mechanism 50 and 51 respectively, with drive couplings 52 and 53 to motor 14. As will be made clear from the following description of the PSA cycle, a preferred embodiment will have the reciprocating phase of cranks 50 and 51 offset by approximately or exactly 90°. A very simple and compact realization of this embodiment is achieved by providing each of the crank mechanisms 51 and 52 as a Scotch yoke, and then mounting cylinders 41 and 42 with 90° offset of their reciprocating axes so that both Scotch yokes 50 and 51 can be driven by a single crank throw (e.g. a crank pin or an eccentric) on a crankshaft coupled to motor 14. Hence, drive couplings 52 and 53 can be consolidated into a single crank driving reciprocation in quadrature of all four cylinders. The crankshaft axis of rotation and the reciprocating axes of cylinders 41 and 42 will then be mutually orthogonal.

If the pistons are reciprocating at a frequency much greater than the frequency of the rotor, then the system is simply a piston compressor embodiment as in FIG. 1. However, an alternative is to synchronize piston reciprocation in both frequency and phase with the PSA cycle so that a complete feed step "A1" is accomplished by a simple stroke of a compressor piston, and an exhaust step "E1" is accomplished by a single stroke of a vacuum pump piston. The reciprocating frequency of the compressor and vacuum is set to be exactly 1.5 times the frequency of the cycle. Pressure variations within the PSA cycle are thus coordinated with those within the compressor and vacuum pump cylinders, enabling an improvement in efficiency and substantially eliminating pressure and flow pulsations extraneous to the PSA cycle itself.

The consolidation of reciprocating crank drives 50 and 51 as a perpendicularly reciprocating pair of Scotch yokes on a single crank pin will be useful for use in manual drives (manual or foot pedal power with a pulley linkage between the motor and the rotor). The manual apparatus could be used in emergencies such as at high altitude mountain survival or rescue, and for survival while awaiting rescue in confined spaces such as in sunken submarines or in collapsed underground coal mines.

Furthermore, power consumption is reduced since the compressor 11 and vacuum pump 13 each follow the changing pressure of the adsorber for respectively feed pressurization and concurrent blowdown steps. Thus, the average working pressure across each of the compressor 11 and vacuum pump 13 is much less than the maximum working pressure.

Figure 4:
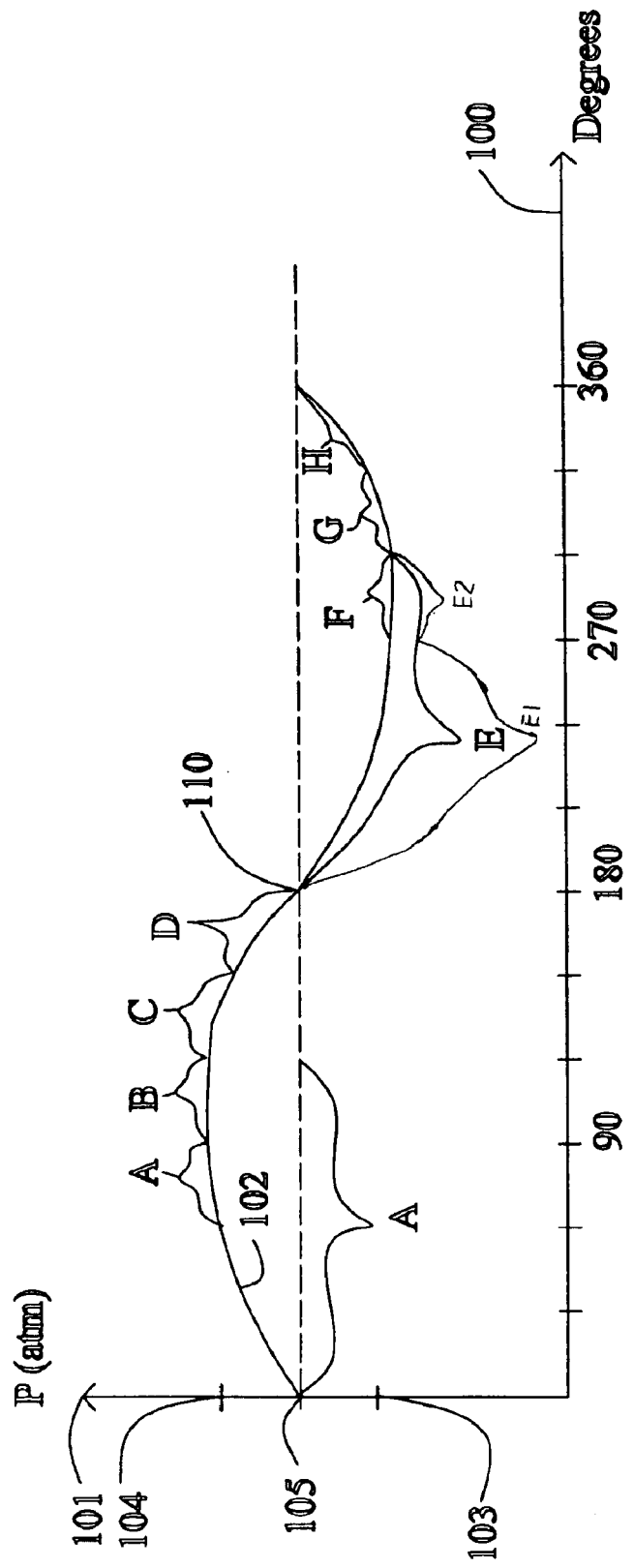
FIG. 4 shows the gas flow pattern and pressure pattern associated with an adsorber of the apparatus of FIG. 1.
Figure 5:
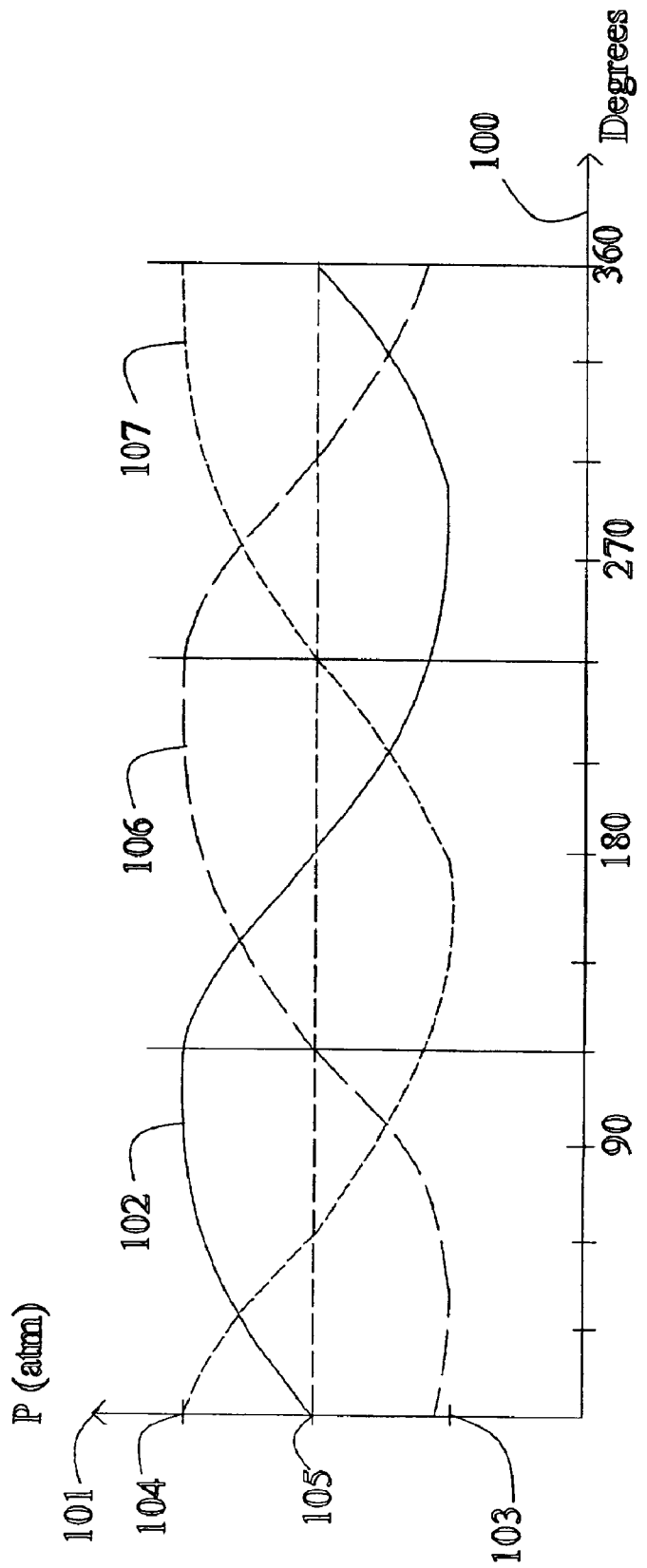
FIG. 5 shows the pressure pattern for all three adsorbers.

B. FIGS. 4 and 5

FIGS. 4 and 5 show the cyclic variation of the working gas pressure at the first ends of the adsorbers over a cycle period corresponding to 360° rotation of the rotary PSA apparatus of FIGS. 1 and 3. FIG. 4 shows the cycle for adsorber 1, while FIG. 5 shows the cycle for all three adsorbers charted 120° out of phase from each other.

The horizontal axis 100 of FIG. 4 represents angular position of the rotary valve faces, in 30° fractions of the cycle period. The vertical axis 101 represents the working pressure in adsorber 1.

Curve 102 shows the position variation of the flow path through the valve face plates, with the system pressure cycling between higher pressure 104 and the lower pressure 103. Pressures 105 and 110 are the intermediate pressures in the cycle. Similarly, curves 106 and 107 show the position variation of the flow path through the valve face plates for the second and third adsorbers.

The cycle typically includes the following process steps.

1. Feed pressurization, which extends over the feed time interval from positions 0° to 120° of the cycle period on horizontal axis 100. At the beginning of the cycle (0°), feed gas is fed through inlet filter 12 to a compressor 11 and the first ends 5–7 of the adsorbers 1–3, bringing the system to its higher pressure 104. The feed step includes feed from first intermediate pressure 105 to the higher pressure 104. Typically, the first intermediate pressure 105 is nominally atmospheric pressure.

2. A and B: Feed with production and production for backfill (pressurization with gas enriched in the second component). In step A, between 60° and 90°, light product gas is withdrawn from the second end 8 of adsorber 1 through a light product port. Between 90° and 120° (step B), light reflux is withdrawn from the second end 8 of adsorber 1 to backfill adsorber 2.

3. C and D: The cocurrent blowdown step extends over the cocurrent blowdown interval from 120° to 180°. Between 120° and 150° (step C), light reflux gas is withdrawn from the second end 8 of adsorber 1 to equalize the buffer chamber 29. During 150° to 180° (step D), light reflux gas is removed from the second end 8 of adsorber 1 to purge adsorber 3. The cocurrent blowdown step begins at substantially the higher pressure 104 and ends at a second intermediate pressure 110, which typically may be approximately equal to the first intermediate pressure 105.

4. E1: The countercurrent blowdown (to exhaust) interval E1 extends from 180° to 270°, bringing the system down from second intermediate pressure 110 to its lower pressure 103.

5. E2: Purge to exhaust. During step E2, gas is removed between 270°–300° from the second end 9 of adsorber 2 to purge adsorber 1. Exhaust is removed from the first end 5 of adsorber 1 from 270°–300°.

6. F and G: The countercurrent re-pressurization step extends from 300° to 360°. The cycle between 300°–330° (step F) equalizes the pressure of the second end 9 of adsorber 1 by fluidly coupling it to the buffer chamber 29. The cycle between 330°–360° (step G) is applied to backfilling adsorber 1 from adsorber 3.

The following sequence Table 1 illustrates the above sequence description. In Table 1, "F" represents feed port, "E" represents exhaust port, "P" represents product port, "B" represents buffer chamber, "H1", "H2", and "H3" represent apertures on the first rotor valve face 37 fluidly communicating with the first, second and third adsorbers, respectively (see FIG. 7), and "L1", "L2", and "L3" designate apertures on the second rotor valve face 38 fluidly communicating with the first, second, and third adsorbers, respectively (see FIG. 10).

TABLE 1

Sequence Table

| | | Adsorber 1 | | | Adsorber 2 | | | Adsorber 3 | | |
|---|---|---|---|---|---|---|---|---|---|---|
| Step | Time (° of rotation) | 1st Stator valve | 2nd Stator Valve | State | 1st Stator valve | 2nd Stator Valve | State | 1st Stator valve | 2nd Stator Valve | State |
| 1 | 0–30 | F to H1 | Closed | Feed pressurization | Closed | L2 to B | Provide buffer gas | H3 to E | Closed | Exhaust |
| 2 | 30–60 | F to H1 | Closed | Feed pressurization | Closed | L2 to L3 | Provide purge | H3 to E | L2 to L3 | Purge |
| 3 | 60–90 | F to H1 | L1 to P | Production | H2 to E | Closed | Exhaust | Closed | B to L3 | Pressurization from buffer |
| 4 | 90–120 | F to H1 | L1 to L3 | Provide product pressurization | H2 to E | Closed | Exhaust | Closed | L1 to L3 | Product pressurization |
| 5 | 120–150 | Closed | L1 to B | Provide buffer gas | H2 to E | Closed | Exhaust | F to H3 | Closed | Feed pressurization |
| 6 | 150–180 | Closed | L1 to L2 | Provide purge | H2 to E | L1 to L2 | Purge | F to H3 | Closed | Feed pressurization |
| 7 | 180–270 | H1 to E | Closed | Exhaust | Closed | B to L2 | Pressurization from buffer | F to H3 | L3 to P | Production |
| 8 | 210–240 | H1 to E | Closed | Exhaust | Closed | L3 to L2 | Product pressurization | F to H3 | L3 to L2 | Provide product pressurization |
| 9 | 240–270 | H1 to E | Closed | Exhaust | F to H2 | Closed | Feed pressurization | Closed | L3 to B | Provide buffer gas |
| 10 | 270–300 | H1 to E | L3 to L1 | Purge | F to H2 | Closed | Feed pressurization | Closed | L3 to L1 | Provide purge |
| 11 | 300–330 | Closed | B to L1 | Pressurization from buffer | F to H2 | L1 to P | Production | H3 to E | Closed | Exhaust |
| 12 | 330–360 | Closed | L2 to L1 | Product pressurization | F to H2 | L1 to L2 | Provide product pressurization | H3 to E | Closed | Exhaust |

C. FIG. 6

Figure 6:
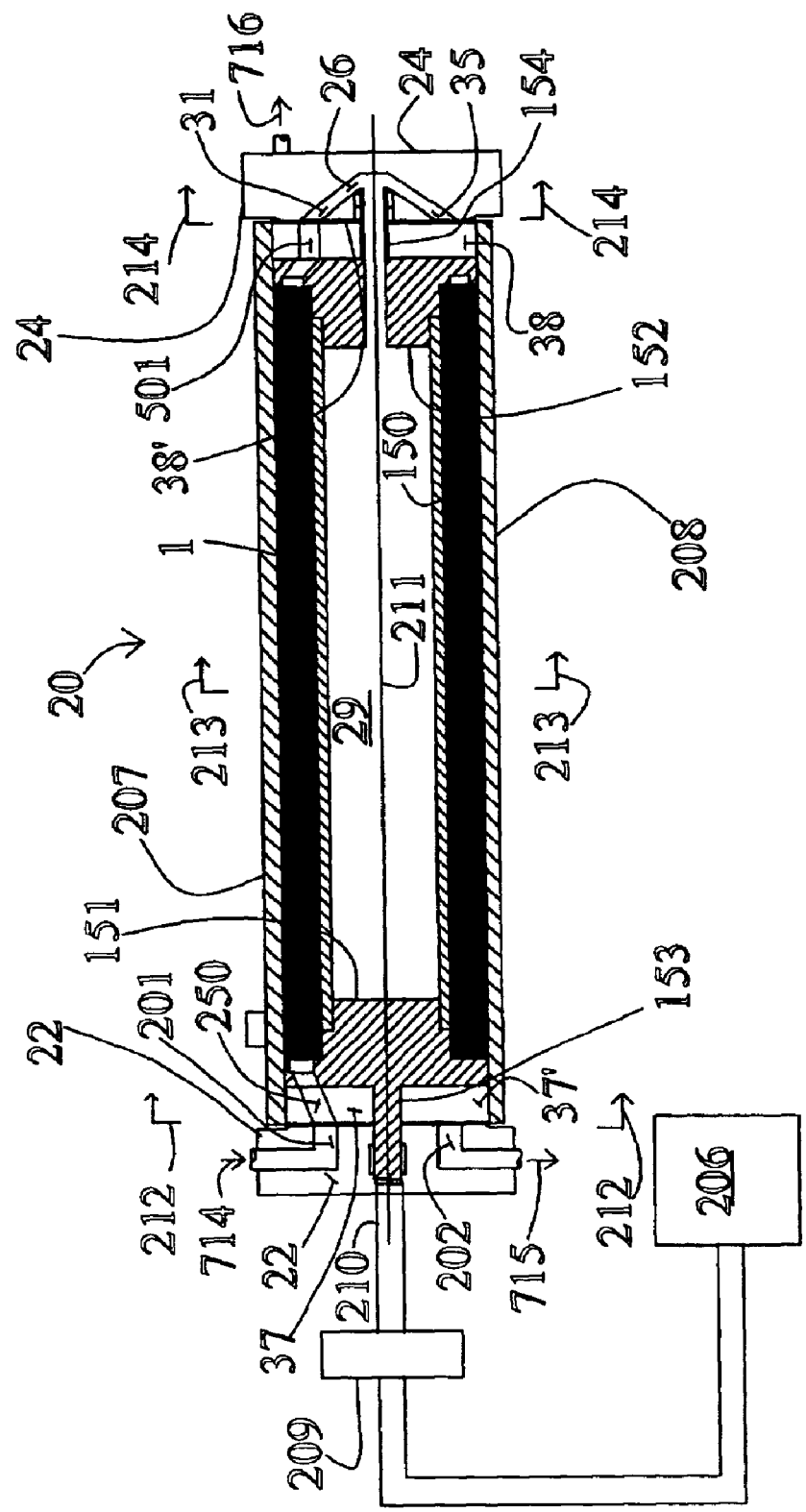
FIG. 6 shows a cross section of a module with each of the two valve ends shown at a different point in the cycle.

FIG. 6 shows an axial section of a rotary PSA module 20. Components are identified with the same reference numerals and nomenclature as in FIGS. 1–3. Transverse cross sections 212, 213 and 214 of module 20 are shown in FIGS. 7–10.

Adsorber housing body 208 is engaged in relative rotation with first valve body 22 and second valve body 24. In this embodiment, adsorber housing body 208 is a rotor with rotary axis 211. The rotor is driven by a motor 206 coupled to gear reducer 209, which is in turn attached to the drive coupling 210. Motor 206 may also be the motor 14 that drives the compressor and exhauster. Motor 14 may be a double-shafted motor with one shaft extension driving the compressor and exhauster, and the other shaft extension driving the rotary PSA module.

The adsorber housing body or rotor 208 has a first valve face plate 37' defining first valve face 37, and a second valve face plate 38' defining second valve face 38. The adsorbers (e.g. adsorber 1) are shown as spirally wound layered laminates of adsorbent sheet material with spacers, as further illustrated in FIGS. 8a and 8b. The adsorbers are spirally wound or wrapped around a cylindrical tube mandrel 150 whose interior volume is conveniently used as buffer chamber 29. The mandrel 150 is supported on first and second end plugs 151 and 152, which respectively carry first and second valve face plates 37' and 38', and an outer housing sleeve 207 encompassing the adsorbers. The first end plug 151 has a stub shaft 153 coupled to drive shaft 210. The second end plug 152 has a hollow stub shaft 154 which provides fluid communication between buffer chamber 29 and the second light reflux conduit 26 in the second valve body 24. The second light reflux conduit 26 is narrow enough to function as a nonadjustable throttle restrictor 26' for achieving pressure letdown during equalization from an adsorber to the buffer chamber, and then from the buffer chamber to another adsorber.

Figure 7A:
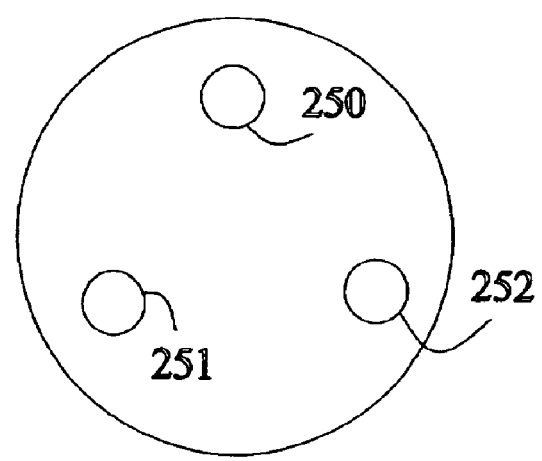
FIG. 7a is a cross sectional view of a first rotor valve face taken along line 212 in FIG. 6.
Figure 7B:
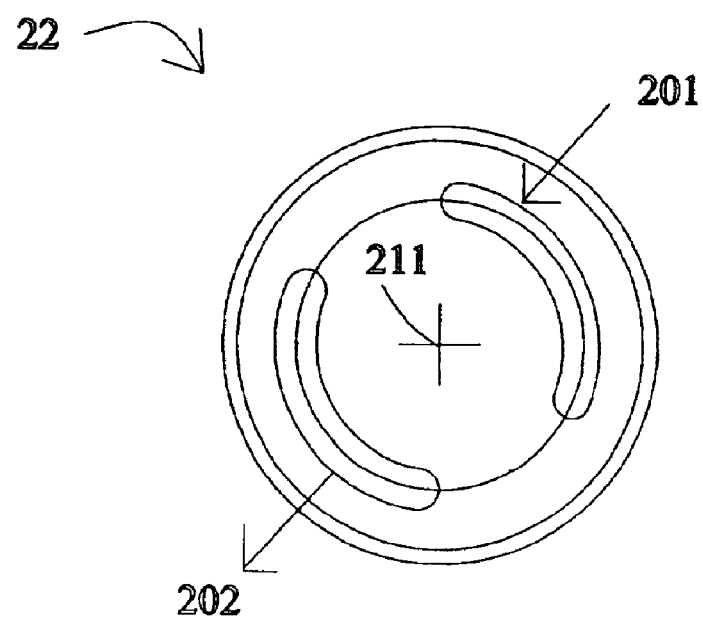
FIG. 7b is a cross sectional view of a first stator valve face taken along line 212 in FIG. 6.
Figure 10A:
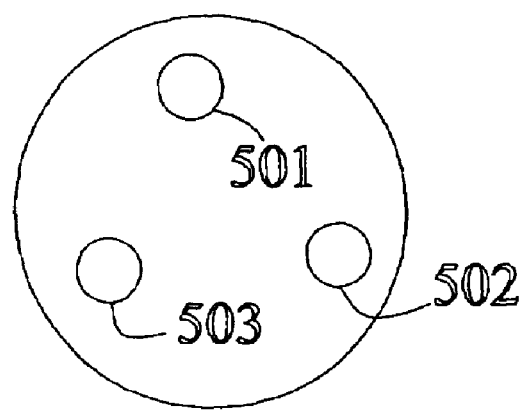
FIG. 10a is a cross sectional view of the second rotor valve face taken along line 214 of FIG. 6.
Figure 10B:
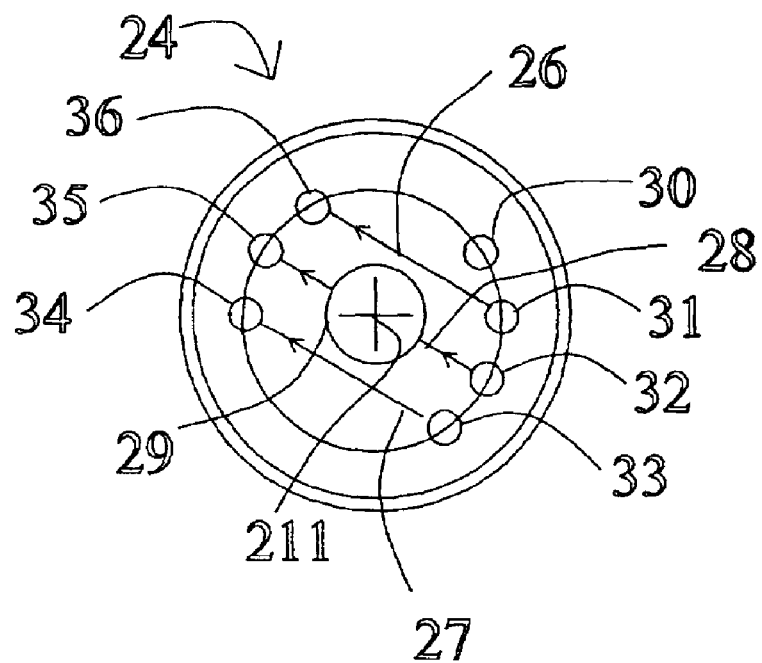
FIG. 10b is a cross sectional view of the second stator valve face taken along line 214 of FIG. 6.

The first and second valve face plates of the rotor are shown in FIGS. 7a and 10a, while the porting of the first and second valve bodies in valve faces 37 and 38 is shown in FIGS. 7b and 10b. In FIG. 6, the first valve is drawn to illustrate the module 20 during the feed step of the PSA cycle. The second valve is drawn to illustrate the module 20 during the second light reflux exit step (equalization to buffer) which would in fact be delayed after the feed step.

D. FIG. 7

FIGS. 7a and 7b are taken at the cross section 212 on FIG. 6. FIG. 7a shows the first rotor valve face 37. The first rotor valve face 37 defines first apertures 250 (H1), second aperture 251 (H2) and third aperture 252 (H3) that facilitate the flow action of gases from one adsorber to another corresponding to the sequencing illustrated by and described with reference to FIGS. 4 and 5. H1, H2 and H3 correspond to the first rotor valve openings for adsorbers 1, 2 and 3, respectively.

FIG. 7b shows the first stator valve face 22. Feed enters through feed port aperture 201 and exhaust exits through exhaust port aperture 202.

Figure 8A:
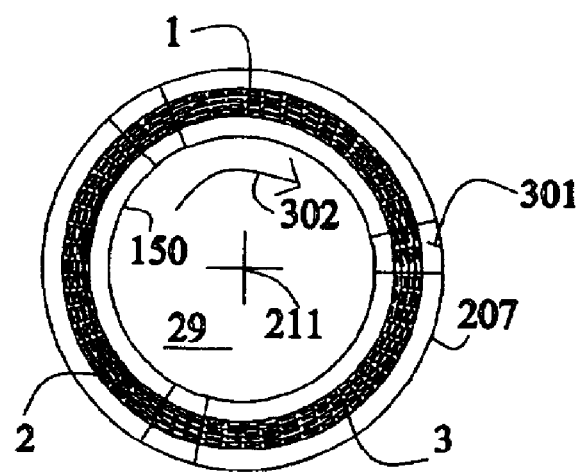
FIG. 8a is a cross sectional view of a rotor laminate adsorber.
Figure 8B:
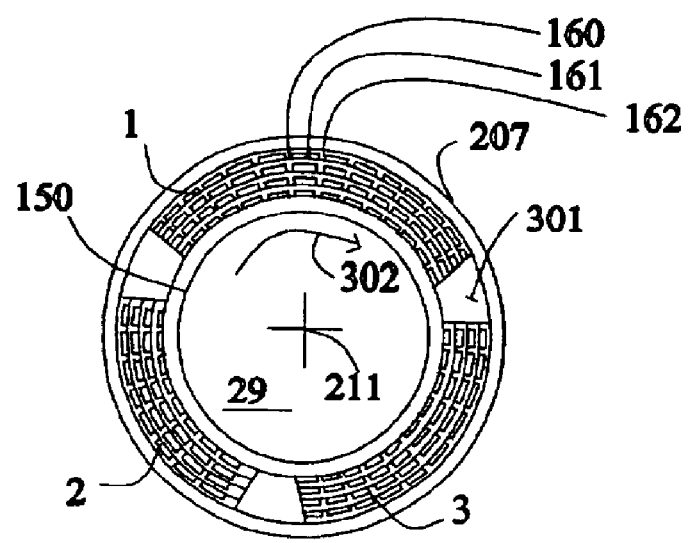
FIG. 8b is a cross sectional view of multiple sheets of laminate with physical separators.

E. FIGS. 8a and 8b

FIG. 8a shows the laminate adsorbers at a transverse cross section 213 of FIG. 6. The three adsorbers may be formed as a single spiral roll of adsorbent sheet 160 with spacers 161 between the layers to define flow channels 162. The three adsorbers 1, 2 and 3 are respectively divided within the single spiral roll by partitions 301 that are formed by impregnating a sealant in a narrow zone of the laminate adsorber to substantially prevent lateral fluid communication across each such partition zone 301. The partitions 301 are positioned at substantially 120° intervals. The spiral roll is wrapped around mandrel 150, and to prevent bypass flow may be sealed by an appropriate sealant within housing sleeve 207. Discontinuities in the spiral roll at the beginning and end of the roll may desirably be accommodated with one of the partition zones, as shown. Buffer chamber 29 is located in the center of the rotor 23. Arrow 302 shows the direction of rotation of the adsorber assembly.

FIG. 8b shows the adsorber formed by wrapping distinct rectangular adsorbent sheets with spacers for each adsorber. The partitions 301 are now provided as solid sealing members between the adsorbers, extended from mandrel 150 to housing sleeve 207. The width of the adsorbent sheets is less than ⅓ of the circumference by the width of the partition member 301.

F. FIG. 9

Figure 9:
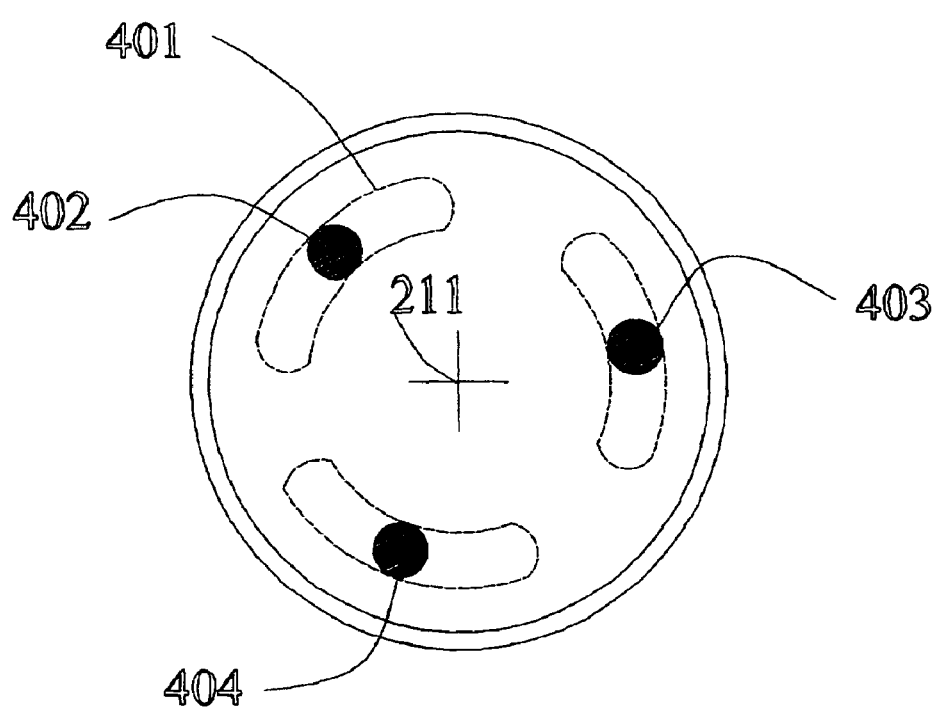
FIG. 9 is a cross sectional view of a rotor valve face taken along line 213 in FIG. 6.

FIG. 9 shows the rotor valve face cross section taken along line 213 in FIG. 6. The dashed slots 401 correspond to the relative positions of the adsorbers in the rotor assembly. Ports 402, 403 and 404 represent the rotor port apertures 501, 502 and 503 (as seen in FIG. 10a) or 250, 251 and 252 (as seen in FIG. 7a), depending on which rotor face is being described.

G. FIG. 10

FIG. 10a shows the second rotor valve face 38. FIG. 10b shows the second stator valve face 24. Both figures are taken at cross section 214 on FIG. 6. The second rotor valve face 38 defines a first aperture 501 (L1), a second aperture 502 (L2) and a third aperture 503 (L3) that facilitate the flow action of gases from one adsorber to another corresponding to the sequencing defined in the FIGS. 4 and 5 description. L1, L2 and L3 correspond to the second rotor valve openings for adsorbers 1, 2 and 3, respectively.

Second stator valve face defines first, second and third light reflux exit ports 31, 32 and 33, respectively, and first, second and third light reflux return ports 36, 35 and 34, respectively. Second stator valve face further defines a product port aperture 30 fluidly communicating with product port 203. The buffer chamber 29 is located in the center of the second stator valve face 24.

Figure 11:
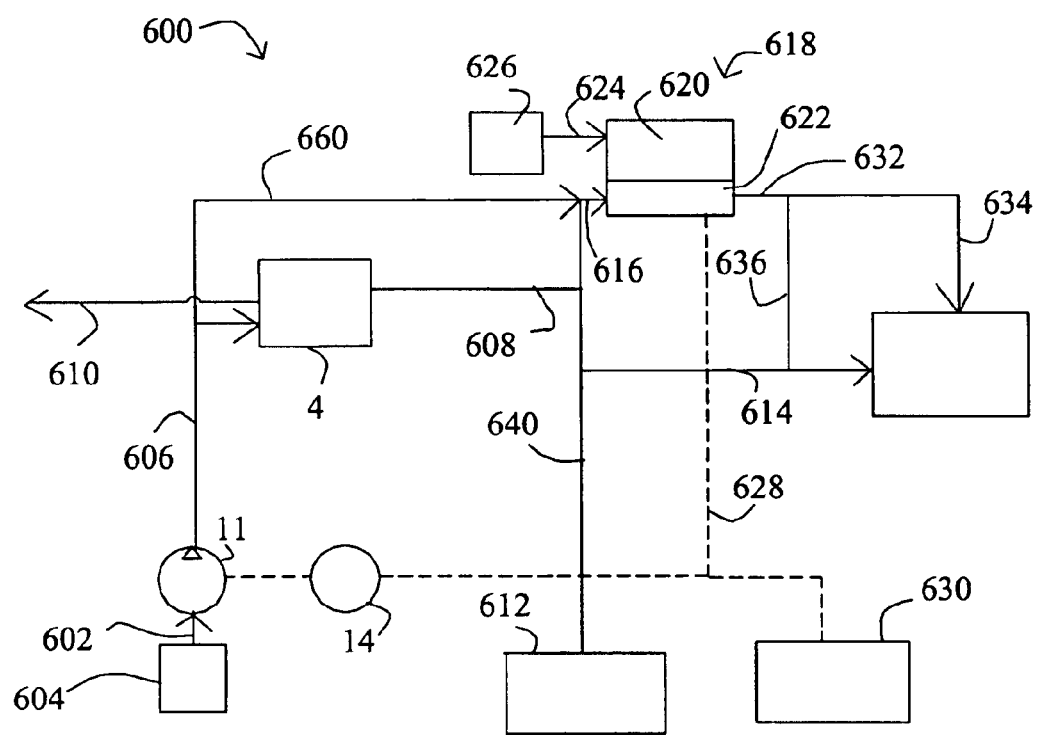
FIG. 11 is a schematic view illustrating at least partial feed of a product gas to a fuel cell powering a rotary pressure swing adsorption device.
Figure 12:
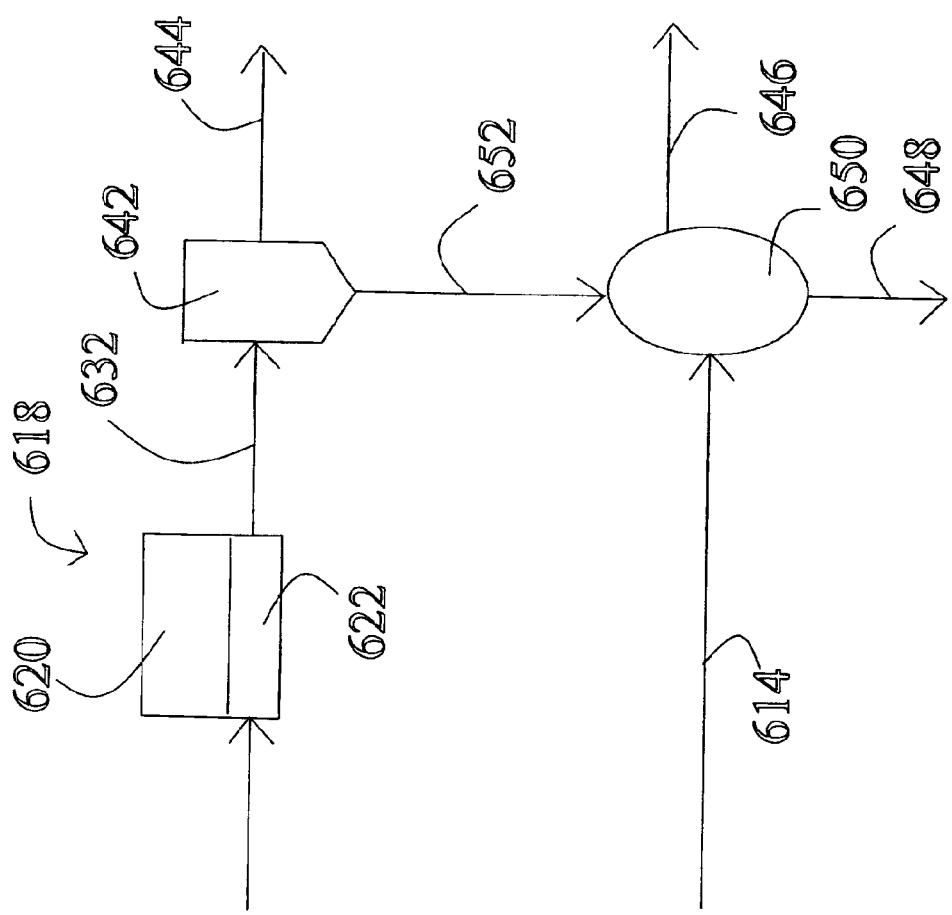
FIG. 12 is a schematic view illustrating using a water knock out trap and then humidifying the PSA oxygen stream.
Figure 14:
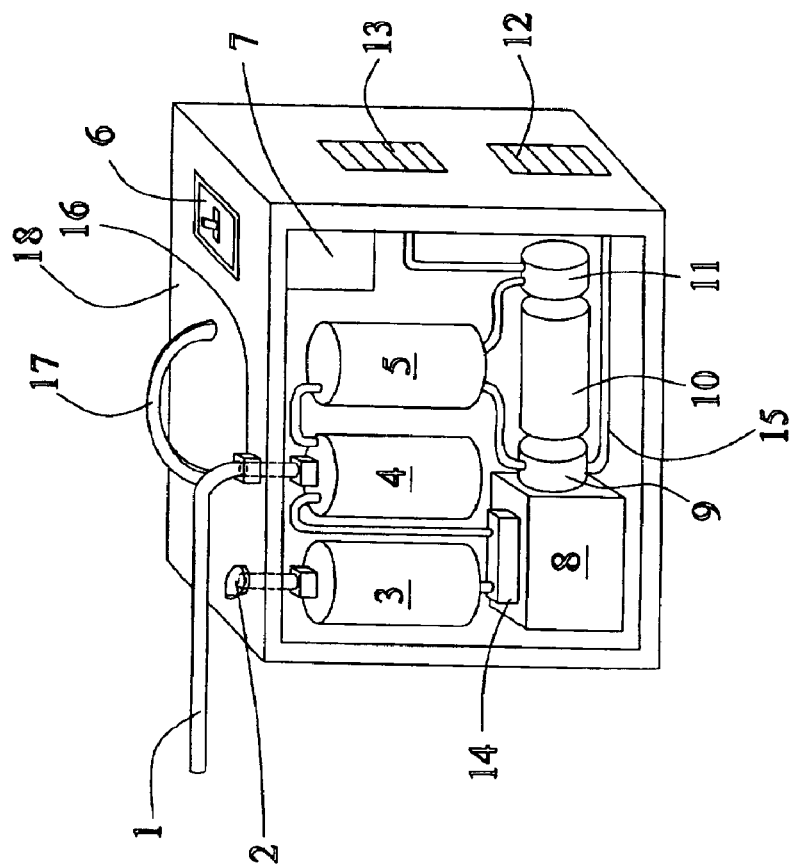
FIG. 14 is a perspective view of a portable gas separator.

H. FIGS. 11, 12, and 14

The PSA devices described herein can be powered manually, such as by a crank described above. Alternatively, the PSA device can be operably coupled to a fuel cell power source. An example of a suitable fuel cell is described in U.S. Pat. No. 5,200,278. However, the disclosed method and system for practicing the method are not limited in scope to particular fuel cells and can be used in combination with various classes of fuel cells, including without limitation, polymer electrolyte membrane (PEM) fuel cells, alkaline fuel cells and solid oxide fuel cells.

As described above, one disclosed embodiment of the system and process involves powering a pressure swing adsorption apparatus with a fuel cell to produce a product gas, particularly oxygen. The pressure swing adsorption device can be a rotary bed apparatus, a rotary valve apparatus, or an apparatus that includes both. With reference to oxygen, oxygen can be withdrawn as a light product gas or a heavy product gas. A portion of the oxygen product gas may be supplied to an oxidant inlet line of the cathode of the fuel cell to increase its efficiency. The system is described in FIG. 11 with reference to the PSA device 4 depicted in FIGS. 1–3, but any suitable PSA configuration may be utilized.

With reference to FIG. 11, a system 600 is illustrated for powering a portable gas separator, such as a medical oxygen concentrator, using a fuel cell. Air stream 602 is drawn into system 600, such as by actuating compressor 11 of PSA device 4 to provide a feed air stream 606. The actuating compressor may be powered by a motor 14. According to particular embodiments, the motor 14 may be an electric motor (e.g., a stepper motor) or a hydraulic motor. Air may optionally be drawn through a filter 604 to provide a filtered feed air stream 606. Filter 604 may include a desiccant material, for example, for removing water vapor from the air stream 602. Feed air stream 606 flows into the adsorbers of PSA device 4 in a flow path from a first end of the adsorbers to a second end of the adsorbers, thereby producing a light product stream 608. Embodiments of PSA device 4 that include nitrogen adsorbing materials will generate a light product stream 608 enriched in oxygen relative to the air stream 606. A second product gas, such as nitrogen, can be exhausted from pressure swing adsorption device 4 via exhaust stream 610.

Light product stream 608 can be introduced into a first user supply line 614. The gas (e.g., enriched oxygen) in the first user supply line can be administered to the user by techniques known in the art. The purity of light product stream 608 can be varied using techniques such as those described above, including varying the adsorbent material positioned in the flow path of the adsorbers. Working embodiments of PSA device 4, using a lithium-exchanged adsorbent material, have produced a light product steam 608 enriched in oxygen relative to air stream 602 (i.e., a light product stream 608 having greater than about 30 volume % oxygen, preferably greater than 80 volume % oxygen, more preferably greater than about 90% oxygen, with best results providing oxygen of 95 volume %+ purity). Oxygen of such high purity satisfies current medical standards for supplying to a patient via first user supply line 614. Lower oxygen purities can be used for other purposes, such as for emergency administration of oxygen. An oxygen sensor (not shown) could be coupled to the first user supply line 614 to monitor the presence (or amount) of oxygen in the first user supply line 614.

A portion of the light product gas also can be directed to storage container 612. In particular, oxygen not being consumed by the patient may be used to recharge product gas container 612 via supply line 640. Storage container 612 can stabilize pressure swings in the first user supply line 614 by providing a buffer volume of light product gas. During operation of the PSA device 4, a pulsating flow of light product stream is typically produced. A large volume of the light product gas in container 612 can damp out the pulsating flow so that a steady pressure and flow can be delivered to the user.

A portion of light product stream 608 can be supplied via fuel cell inlet line 616 to fluidly couple fuel cell 618 to light product stream 608 of pressure swing adsorption device 4. Fuel cell inlet line 616 could be coupled, for instance, to an oxidant inlet port (not illustrated) of fuel cell 618. Fuel cell 618 is illustrated as being divided into an anode side 620 and a cathode side 622. Fuel cell inlet line 616 delivers light product, such as oxygen to cathode side 622 of fuel cell 618. Optionally, air and/or water vapor can be mixed with the light product stream 608 via conduit 660 and the resulting mixture can be introduced into fuel cell inlet line 616.

Fuel cell 618 also is fluidly coupled to a fuel line, such as hydrogen fuel line 624, and fuel supply, such as hydrogen fuel supply 626. The hydrogen fuel supply 626 may be a container of compressed hydrogen gas, cryogenic hydrogen liquid, or hydrogen stored in a hydrogen sorbent bed (e.g., a metal hydride or active carbon). Hydrogen could also be supplied to the fuel cell by other mechanisms. For example, methanol can be converted to hydrogen at elevated temperatures by reforming at about 200° C. to about 250° C. using a catalyst. Alternatively, the fuel supply could be methanol or a methanol/water mixture that is directly supplied to a methanol fuel cell.

A power line 628 for carrying an electrical current operably couples fuel cell 618 to motor 14 and hence fuel cell 618 is the power source for PSA 4. The motor 14 may be mechanically coupled to the rotating adsorber bed or rotating valve in order to rotate the adsorber bed or valve (or both) of the PSA device 4. For example, a shaft (see, e.g., FIG. 6) can be coupled to the motor 14 and the adsorber bed or valve of the PSA device 4. Power line 628 also can be used to supply power to additional loads 630, such as a wheelchair for a portable medical oxygen concentrator or an illumination source for an emergency oxygen concentrator.

The desired product stream, either light or heavy depending on the adsorbent, is enriched in oxygen before being supplied to the fuel cell 618. Enriched gas streams entering the fuel cell 618 result in an exhaust stream 632 from the cathode side 622 comprising water vapor, and still significantly enriched in oxygen relative to air stream 602. Thus, the exhaust stream 632 from the cathode side 622 of the fuel cell 618 can be fed directly to a user via second user supply line 634. Alternatively, a fuel cell exhaust line 636 may mix exhaust gas with the product stream 614 to form a user feed mixture that is supplied to first user supply line 614. In either embodiment, a sensor can be coupled to the cathode exhaust stream 632 to monitor the presence of hydrogen in case of a fuel cell failure. Such a sensor may reduce the possibility that a user inhales an oxygen/hydrogen mixture. According to a further variant, the exhaust stream 632 from the cathode side 622 of the fuel cell 618 can be delivered to ambient atmosphere rather than to the user. If a direct methanol fuel cell is employed, the cathode exhaust preferably is not directed to a user since the cathode exhaust may include residual methanol. The cathode exhaust stream could be delivered to ambient atmosphere or recirculated through the fuel cell.

In certain embodiments, the first user supply line 614 may not be present and the light product stream 608 is fed only into the fuel cell inlet line 616. Thus, the second user supply line 634 serves as the only oxygen-enriched source for the user.

Although the exhaust stream 632 exiting the fuel cell 618 is still significantly enriched in oxygen, its purity is slightly less than that of the first user supply line 614. For example, a product stream 608 of 95 volume % oxygen supplying the fuel cell 618 will produce an exhaust stream 632 of about 93 volume % oxygen. Thus, to utilize the desirable water component of exhaust stream 632 while maintaining the high level of purity being fed to the patient, i.e., 95 volume % oxygen, the water component of exhaust stream 632 may be separated from the exhaust stream and added to the first user supply line 614 prior to being fed to the user.

In one embodiment, as shown in FIG. 12, the exhaust stream 632 is fed into a gas/liquid separator, such as cyclone separator 642, which separates the water from the gaseous portion of the exhaust stream. The gas portion of exhaust stream 632 exits the separator 642 via line 644 to atmosphere. Water exiting the separator 642 is fed through water supply line 652 into a humidifier 650, which also receives product gas via product supply line 614. The humidifier 650 vaporizes the water into the product gas that is then fed to the user via third user supply line 646. Exhaust water may be drained from the humidifier via drain line 648, or alternatively, it may be re-circulated within the humidifier.

A battery may be coupled to the PSA/fuel cell systems described herein to provide initial power to the PSA to start the PSA. The PSA will begin to produce an oxygen-enriched product stream that will subsequently initiate the reactions in the fuel cell for providing power to the PSA. Alternatively, a relatively small oxygen-storage container could be coupled to the PSA/fuel cell systems for providing initial oxygen to the fuel cell for start-up of the PSA and the complete system. A further startup option involves exposing the fuel cell cathode compartment to ambient air. The air exposure could be gradually reduced as the PSA begins to produce an oxygen-enriched product stream. A fan powered by a small battery could enhance the amount of ambient air present in the fuel cell.

A portable gas separator (e.g., an oxygen concentrator) is depicted in FIG. 14. Any reference numerals in FIG. 14 that are same as reference numerals in the FIGS. 1–13 do not correspond to like elements. The portable gas separator includes a housing 18. Housing 18 may fully or partially enclose the other components of the portable gas separator. The housing 18 can include a handle 17 for carrying the portable gas separator. A control panel 6 and associated electronic control box 7 may be secured to the housing 18 for controlling the various gas streams in the portable gas separator.

A feed air inlet filter 12 is defined on a side of the housing 18. A gas exhaust outlet filter 13 is also defined on a side of the housing 18. The feed air inlet filter 12 fluidly communicates with a compressor 9 via feed air conduit 15. Compressed feed air is introduced to a PSA module 5. Light product gas (e.g., an oxygen-enriched gas) exits PSA module 5 and enters an oxygen storage container 4. Oxygen-enriched gas can be provided from the oxygen storage container 4 to a user supply line 1 and/or a fuel cell 8. The user supply line 1 can include a control valve 16 for controlling the flow of the oxygen-enriched gas. An anode fuel storage container 3 fluidly communicates with fuel cell 8. The anode fuel storage container 3 may be, for example, a cylinder of compressed hydrogen cylinder, a canister of hydrogen adsorbed by a metal hydride, or a tank of methanol. A fuel port 2 may be connected to the anode fuel storage container 3 in order to replenish the anode fuel storage container 3. Control valves 14 may be provided on fuel cell 8 to regulate the fuel and oxygen-enriched gas into the fuel cell 8.

The fuel cell is electrically coupled to a motor 10. The motor 10 is operably coupled to the compressor 9 and a vacuum pump 11. The vacuum pump 11 fluidly communicates with the PSA module for withdrawing heavy product gas (e.g., nitrogen-enriched gas) from the PSA module and out of the housing 18 via the gas exhaust outlet filter 13.

Having illustrated and described several embodiments, it should be apparent to those of ordinary skill in the art that modifications, alternatives, and equivalents may be included within the spirit and scope of the disclosure.

We claim:

1. A system, comprising:
a pressure swing adsorption apparatus that can produce a product gas and that defines a product gas outlet; and
a fuel cell power source powering the pressure swing adsorption apparatus and defining a cathode feed inlet, the product gas outlet being fluidly coupled to the cathode feed inlet of the fuel cell power source to deliver at least a portion of the product gas to the fuel cell power source.

2. The system according to claim 1, wherein the pressure swing adsorption apparatus comprises a rotary pressure swing adsorption apparatus.

3. The system according to claim 2, wherein the rotary pressure swing adsorption apparatus comprises a rotary bed pressure swing adsorption apparatus.

4. The system according to claim 3, wherein the fuel cell power source powers the rotation of the rotary beds.

5. The system according to claim 2, wherein the rotary pressure swing adsorption apparatus comprises a rotary valve pressure swing adsorption apparatus.

6. The system according to claim 5, wherein the fuel cell power source powers the rotation of the rotary valves.

7. The system according to claim 2, wherein the pressure swing adsorption apparatus further comprises a plurality of adsorbers and a plurality of valve systems cooperating with the adsorbers such that at least one first gas stream is supplied to the adsorbers and at least one second gas stream is withdrawn from the adsorbers, wherein the adsorbers and the valve systems both rotate.

8. The system according to claim 1, wherein the product gas comprises a gas that is enriched in oxygen relative to air.

9. The system according to claim 1, wherein the pressure swing adsorption apparatus further comprises at least one compressor and at least one exhauster and the fuel cell power source powers the compressor and the exhauster.

10. The system according to claim 1, wherein the pressure swing adsorption apparatus further comprises:
a stator; and
an adsorber rotor rotatable relative to the stator about a rotation axis, wherein the adsorber rotor includes 2 to 10 adsorbers angularly spaced about the rotation axis.

11. The system according to claim 10, further comprising:
a first valve face between the stator and the adsorber rotor that defines at least one feed gas port and at least one exhaust gas port; and
a second valve face between the stator and the adsorber rotor that defines at least one product gas port;
wherein the adsorbers can fluidly couple to the first valve surface and the second valve surface.

12. The system according to claim 1, wherein the fuel cell is selected from a polymer electrolyte membrane fuel cell, an alkaline fuel cell or a solid oxide fuel cell.

13. The system according to claim 1, wherein the fuel cell comprises a direct methanol fuel cell.

14. A system, comprising:
a pressure swing adsorption apparatus that can produce a product gas;
at least one motor coupled to the pressure swing adsorption apparatus; and
a fuel cell that receives at least a portion of the product gas; and
a power line coupled between the fuel cell and the motor.

15. The system according to claim 14, wherein the motor drives at least one component of the pressure swing adsorption apparatus selected from a rotary adsorber bed, a rotary valve, a compressor, and an exhauster.

16. The system according to claim 14, wherein the product gas comprises a gas that is enriched in oxygen relative to air and the fuel cell includes a cathode that receives the product gas.

17. The system according to claim 14, wherein the pressure swing adsorption apparatus comprises a rotary bed pressure swing adsorption apparatus that includes a rotary adsorber bed, at least one compressor, and at least one exhauster, and wherein the motor drives the rotary adsorber bed, the compressor, and the exhauster.

18. The system according to claim 14, wherein the pressure swing adsorption apparatus comprises a rotary valve pressure swing adsorption apparatus that includes a rotary valve, at least one compressor, and at least one exhauster, and wherein the motor drives the rotary valve, the compressor, and the exhauster.

19. The system according to claim 14, wherein the fuel cell is selected from a polymer electrolyte membrane fuel cell, an alkaline fuel cell or a solid oxide fuel cell.

20. The system according to claim 14, wherein the fuel cell comprises a direct methanol fuel cell.

21. A portable gas separator, comprising:
   a housing;
   a rotary pressure swing adsorption apparatus housed by the housing that can produce a product gas;
   a motor coupled to the rotary pressure swing adsorption apparatus;
   a fuel cell that receives at least a first portion of the product gas; and
   a power line coupled between the fuel cell and the motor.

22. The gas separator according to claim 21, wherein the rotary pressure swing adsorption apparatus defines a product gas outlet for delivering the product gas and the fuel cell defines a cathode inlet, the product gas outlet being fluidly coupled to the cathode inlet port of the fuel cell.

23. The gas separator according to claim 21, wherein the rotary pressure swing adsorption apparatus comprises:
   a stator; and
   an adsorber rotor rotatable relative to the stator about a rotation axis, wherein the adsorber rotor includes 2 to 10 adsorbers angularly spaced about the rotation axis.

24. The gas separator according to claim 23, wherein the adsorbers are equally spaced about the rotation axis.

25. The gas separator according to claim 23, further comprising:
   a first valve face between the stator and the adsorber rotor that defines at least one feed gas port and at least one exhaust gas port; and
   a second valve face between the stator and the adsorber rotor that defines at least one product gas port;
   wherein the adsorbers can fluidly couple to the first valve surface and the second valve surface.

26. The gas separator according to claim 25, wherein the product gas port is fluidly coupled to an inlet port of the fuel cell.

27. The gas separator according to claim 23, wherein the rotary pressure swing apparatus further comprises a buffer chamber fluidly coupled to the adsorbers.

28. The gas separator according to claim 21, wherein the product gas comprises a gas that is enriched in oxygen relative to air.

29. The gas separator according to claim 28, wherein a second portion of the product gas is supplied to a human being.

30. The gas separator according to claim 21, wherein first portion of the product gas is supplied directly to the fuel cell.

31. The gas separator according to claim 21, wherein the fuel cell is selected from a membrane-based fuel cell, an alkaline fuel cell and a solid oxide fuel cell.

32. The gas separator according to claim 21, wherein the rotary pressure swing adsorption apparatus includes at least one zeolite adsorbent material.

33. The gas separator according to claim 32, wherein the zeolite adsorbent material comprises at least one lithium-exchanged zeolite.

34. The gas separator according to claim 21, wherein the rotary pressure swing adsorption apparatus includes two or more different adsorbent materials.

35. The gas separator according to claim 21, wherein the rotary pressure swing adsorption apparatus includes at least two adsorbers wherein a first adsorber includes a first adsorbent material and a second adsorber includes a second adsorbent material.

36. The system according to claim 21, wherein the fuel cell is selected from a polymer electrolyte membrane fuel cell, an alkaline fuel cell or a solid oxide fuel cell.

37. The system according to claim 21, wherein the fuel cell comprises a direct methanol fuel cell.

38. A portable oxygen concentrator, comprising:
   a rotary pressure swing adsorption apparatus that can produce an oxygen-enriched gas;
   a motor coupled to the rotary pressure swing adsorption apparatus;
   a fuel cell that can provide an electrical current to the motor and that receives at least a first portion of the oxygen-enriched gas; and
   a first user supply line fluidly coupled to the rotary pressure swing apparatus that can supply at least a second portion of the oxygen-enriched gas to a human being.

39. The concentrator according to claim 38, further comprising a conduit fluidly coupling the first user supply line with a cathode exhaust outlet of the fuel cell.

40. The concentrator according to claim 38, further comprising a second user supply line fluidly coupled to a cathode exhaust outlet of the fuel cell that can supply the cathode exhaust to a human being.

41. The concentrator according to claim 40, further comprising a hydrogen sensor coupled to the second user supply line.

42. The concentrator according to claim 38, wherein the fuel cell includes a cathode that produces an exhaust stream that includes water vapor and that defines a cathode exhaust outlet, the concentrator further comprising:
   a first conduit fluidly coupling the cathode exhaust outlet of the fuel cell with a water separator to remove at least portion of the water vapor; and
   a second conduit fluidly coupling the water separator and the first user supply line to supply the water vapor to the human being.

43. The concentrator according to claim 38, wherein the oxygen-enriched gas comprises at least about 95 volume percent oxygen.

44. The concentrator according to claim 38, further comprising a hydrogen storage container fluidly coupled to the fuel cell.

45. The concentrator according to claim 38, further comprising an oxygen sensor coupled to the first user supply line.

46. A gas separation method, comprising:
   introducing a feed gas into a pressure swing adsorption apparatus to produce a product gas;
   introducing at least a portion of the product gas into a fuel cell; and
   generating an electrical current from the fuel cell to power the pressure swing adsorption apparatus.

47. The method according to claim 46, wherein the pressure swing adsorption apparatus comprises a stator and a rotor housing a plurality of absorbers, the method further comprising rotating the rotor relative to the stator through a rotation period to define a pressure swing adsorption cycle.

48. The method according to claim 47, wherein the rotor houses n adsorbers that are angularly positioned about a rotation axis defined by the rotor.

49. The method according to claim 48, wherein the rotor has a rotation period of substantially 1/n to define the pressure swing adsorption cycle.

50. The method according to claim 46, wherein the pressure swing adsorption apparatus comprises a valve and a body housing a plurality of adsorbers, the method further comprising rotating the valve relative to the body through a rotation period to define a pressure swing adsorption cycle.

51. The method according to claim 46, wherein the feed gas comprises air.

52. The method according to claim 46, wherein the product gas comprises a gas enriched in oxygen relative to air, and the method further comprises introducing the product gas into a cathode inlet defined by the fuel cell.

53. The method according to claim 46, further comprising providing the fuel cell with a mixture of at least one second gas and the product gas.

54. The method according to claim 53, wherein the second gas comprises air, water vapor, or a mixture thereof.

55. The method according to claim 46, further comprising supplying the electrical current to a motor that is coupled to the pressure swing adsorption apparatus.

56. The method according to claim 46, wherein the feed gas comprises a more readily adsorbed component and a less readily adsorbed component, the more readily adsorbed component preferentially adsorbing to adsorbent material under increased pressure to provide the product gas enriched in the less readily adsorbed component.

57. The method according to claim 46, wherein about 10 to about 30 volume percent of the product gas is introduced into the fuel cell.

58. A method for providing oxygen-enriched gas to a human being, comprising:
   introducing a feed gas into a pressure swing adsorption apparatus to produce a product gas that is enriched in oxygen relative to air;
   introducing at least a first portion of the product gas into a fuel cell;
   generating an electrical current from the fuel cell to power the pressure swing adsorption apparatus; and
   providing at least a second portion of the product gas to a human being.

59. The method according to claim 58, further comprising providing a mixture of at least one second gas and the product gas to the fuel cell.

60. The method according to claim 59, wherein the second gas is selected from air, water vapor, or a mixture thereof.

61. The method according to claim 58, where the fuel cell produces a cathode exhaust stream that includes water vapor, the method further comprising separating at least a portion of the water vapor from the cathode exhaust stream and mixing the water vapor with the product gas prior to providing the product gas to the human being.

62. The method according to claim 58, wherein the fuel cell generates about 25 watts to about 1 kilowatt to power the pressure swing adsorption apparatus.

63. The method according to claim 58, wherein product gas volume is from about 1 to about 2 liters per minute.

64. The method according to claim 58, wherein the pressure swing adsorption apparatus comprises a rotary pressure swing adsorption apparatus.

65. The method according to claim 58, further comprising supplying the electrical current to a motor that is coupled to the pressure swing adsorption apparatus.

66. The method according to claim 58, wherein the product gas comprises at least about 95 volume percent oxygen.

67. The method according to claim 58, wherein about 10 to about 30 volume percent of the product gas is introduced into the fuel cell.

68. A method for providing oxygen-enriched gas to a human being, comprising:
   introducing a feed gas into a pressure swing adsorption apparatus to produce a product gas that is enriched in oxygen relative to air;
   introducing at least a first portion of the product gas into a fuel cell to produce a cathode exhaust gas that is enriched in oxygen relative to air;
   generating an electrical current from the fuel cell to power the pressure swing adsorption apparatus; and
   introducing at least a portion of the cathode exhaust gas to a human being.

69. A system, comprising:
   a pressure swing adsorption apparatus that can produce a product gas that is enriched in oxygen relative to air;
   at least one motor coupled to the pressure swing adsorption apparatus; and
   a fuel cell that can provide an electrical current to the motor and that includes a cathode that receives at least a portion of the product gas.

70. A portable gas separator, comprising:
   a housing;
   a rotary pressure swing adsorption apparatus housed by the housing that can produce a product gas, and that defines a product gas outlet for delivering the product gas;
   a motor coupled to the rotary pressure swing adsorption apparatus; and
   a fuel cell that can provide an electrical current to the motor and that defines a cathode inlet that is fluidly coupled to the product gas outlet so that the fuel cell receives at least a portion of the product gas.

71. A portable gas separator, comprising:
   a housing;
   a rotary pressure swing adsorption apparatus housed by the housing that can produce a product gas that is enriched in oxygen relative to air;
   a motor coupled to the rotary pressure swing adsorption apparatus; and
   a fuel cell that can provide an electrical current to the motor and that receives at least a portion of the product gas.

* * * * *